(12) United States Patent
Kitaoka et al.

(10) Patent No.: US 8,041,925 B2
(45) Date of Patent: Oct. 18, 2011

(54) SWITCH COUPLED FUNCTION BLOCKS WITH ADDITIONAL DIRECT COUPLING AND INTERNAL DATA PASSING FROM INPUT TO OUTPUT TO FACILITATE MORE SWITCHED INPUTS TO SECOND BLOCK

(75) Inventors: Toshirou Kitaoka, Kanagawa (JP); Taro Fujii, Kanagawa (JP); Kouichirou Furuta, Kanagawa (JP); Masato Motomura, Kanagawa (JP); Toru Awashima, Tokyo (JP); Takao Toi, Tokyo (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 286 days.

(21) Appl. No.: 11/819,976

(22) Filed: Jun. 29, 2007

(65) Prior Publication Data

US 2007/0260847 A1    Nov. 8, 2007

(30) Foreign Application Priority Data

Jul. 5, 2006   (JP) .................................. 2006-185931

(51) Int. Cl.
*G06F 15/17* (2006.01)
(52) U.S. Cl. ......................................... 712/11; 712/225
(58) Field of Classification Search ........................ None
See application file for complete search history.

(56) References Cited

U.S. PATENT DOCUMENTS

| | | | |
|---|---|---|---|
| 5,469,003 A * | 11/1995 | Kean | ............................... 326/39 |
| 5,710,938 A | 1/1998 | Dahl et al. | |
| 5,790,879 A | 8/1998 | Wu | |
| 7,394,288 B1 * | 7/2008 | Agarwal | ........................ 326/39 |
| 2005/0021578 A1 | 1/2005 | Chen et al. | |
| 2005/0114565 A1 | 5/2005 | Gonzalez et al. | |
| 2007/0165547 A1 * | 7/2007 | Lindwer et al. | ............... 370/256 |

FOREIGN PATENT DOCUMENTS

| | | |
|---|---|---|
| JP | 2001-312481 | 11/2001 |
| JP | 2005-044329 | 2/2005 |
| JP | 2005-515525 T | 5/2005 |
| JP | 2003-76668 | 3/2007 |
| WO | WO 03/009125 A1 | 1/2003 |

OTHER PUBLICATIONS

United Kingdom Search and Examination Report dated Oct. 24, 2007.
Japanese Office Action dated Aug. 24, 2010 (with partial English translation).
Japanese Office Action dated Nov. 16, 2010 (with partial English translation).

* cited by examiner

*Primary Examiner* — Kenneth Kim
(74) *Attorney, Agent, or Firm* — McGinn IP Law Group, PLLC

(57) ABSTRACT

A reconfigurable integrated circuit includes a plurality of function blocks and a plurality of programmable switches to switchably connect between function blocks included in the plurality of function blocks. The plurality of function blocks each includes at least one operation unit or one memory unit. The plurality of function blocks each includes at least one data input port connected to at least on of the plurality of programmable switches and at least one data output port connected to at least one of the plurality of programmable switches. Further, at least a pair of function blocks included in the plurality of function blocks is connected without intervening the programmable switch and data being output from a direct output port included in one of the pair of function blocks can be input to a direct input port included in the other of the pair of function blocks.

8 Claims, 28 Drawing Sheets

RELATED ART

RELATED ART

SWITCH COUPLED FUNCTION BLOCKS WITH ADDITIONAL DIRECT COUPLING AND INTERNAL DATA PASSING FROM INPUT TO OUTPUT TO FACILITATE MORE SWITCHED INPUTS TO SECOND BLOCK

BACKGROUND OF THE INVENTION

1. Field of the Invention

The present invention relates to a reconfigurable integrated circuit capable of determining a circuit configuration by selecting connection relationship between function blocks.

2. Description of Related Art

As a processor unit for executing various data processes, products called CPU (Central Processing Unit) and MPU (Micro Processor Unit) are coming into practical use. In a data processing system using these processor units, an application program including several instructions and processing data are stored in a memory device. The processor unit reads out the instructions and processing data from the memory device to sequentially execute operations. Such processor unit is able to achieve various data processes by switching application programs. However complicated data processes cannot be executed at high speed as the instructions and processing data are sequentially read out from the memory device to be executed.

On the other hand, a dedicated circuit manufactured using cell-based IC and gate array is referred to as a custom IC and ASIC (Application Specific Integrated Circuit) or the like. As in such dedicated circuit, since a logical circuit for executing data processes is formed by hardware, complicated data processes can be executed at high speed. However the dedicated circuit has a disadvantage that it can be used only for particular data processes and is lacking flexibility as compared to the abovementioned data processing system including CPU.

As a middle device between them, a reconfigurable device is known that is capable of changing circuit configuration depending on the application program or processing data. In the reconfigurable device, various operation units and register files are provided as many small-sized function blocks. Further, in a design or operation of a device, the circuit configuration of the reconfigurable device can be changed by changing operation and connection relationship of the function blocks depending on the application program or processing data.

The configuration of a general reconfigurable device 7 is shown in FIG. 22. A function block 70 includes one or a plurality of operation units and register files. A programmable switch (PSW) 15 is provided to lines for connecting between several function blocks 70 and connected to wiring resource for connecting between the function blocks 70 and to input/output ports of function blocks 70. By the control of the programmable switches 15, connections between the function blocks 70 can be switched. As configuration information memories (CFGM) 16 enables to change the configuration of the reconfigurable device 7, they store configuration information regarding the operation of the function blocks 17 and connection relationship of the programmable switches 15 that is required for configuration definition of the reconfigurable device 7. The circuit configuration can be changed by loading the configuration information stored in the configuration memory 16 to the function blocks 70 and programmable switches 15 depending on application programs or processing data.

An array processor, which is one of the abovementioned reconfigurable devices, is disclosed in Japanese Unexamined Patent Application Publication No. 2001-312481 and No. 2003-76668. Hereinafter, the array processor disclosed in Japanese Unexamined Patent Application Publication No. 2001-312481 and No. 2003-76668 is referred to as a first related art. The array processor of the first related art is described with reference to FIGS. 23 to 25.

FIG. 23 shows a configuration example of an array processor 8 according to the first related art. The array processor 8 has a configuration in which processor elements (PE) 81 and programmable switches 15 for electrically connecting among the processor elements (PE) 81 being arranged in matrix. Further, the array processor 8 includes a State Transition Controller (STC) 82 for controlling changes of a circuit configuration by changes in transitions of processing state of the array processor 8, which is specifically the changes in operation of the processor elements 81 and connection relationship between the processor elements 81.

The STC 82 holds a series of object codes being input externally, generates an instruction pointer (IP) for the processor elements 81 and programmable switches 15 and supplies the generated instruction pointer to the processor elements 81 and programmable switches 15. The instruction pointer here is information for specifying an address of an instruction code stored in an instruction memory 801, which is described later in detail. Further, an instruction code is an identifier for specifying the operation of the processor elements 81 and wiring connections by the programmable switches 15. Specifically, the instruction memory 801 corresponds to the configuration memory 16 and an instruction code corresponds to configuration information stored in the configuration memory 16.

The configuration of the processor element 81 is shown in FIG. 24. The processor element 81 includes operation units such as the instruction memory 801, an instruction decoder 802, register file 140, ALU (Arithmetic and Logical unit) 803, which is an operation unit for performing arithmetic and logic operations) and DMU (Data Management Unit) 804, which is an operation unit with functions such as bit processes. Further, an internal wiring resource 805 is a programmable switch for changing data input destination for data input from the programmable switch 15 and connection relationship between the operation units including the register file 140 and ALU 803.

The instruction memory 801 stores an instruction code for defining operations such as a selection of the operation units in the processor element 81. The instruction decoder 802 decodes the instruction code and controls the operations of the operation units including the ALU 803 and internal wiring resource 805. The instruction memory 801 is able to store a plurality of instruction codes and dynamically change the circuit configuration of the array processor 8 by switching an instruction pointer supplied from the STC 82 to the instruction memory 801.

An example of internal configuration for the ALU 803 is shown in FIG. 25. The ALU 803 includes two data input ports 8031 and 8032 and a data output port 8034. A bit wide of input/output data for these ports is m bit, which is a data processing unit in the array processor 8. Further, the ALU 803 includes a 2-input logic operation unit 128, 2-input selector 129, 2-input m bit wide adder/subtracter 126 and 2-input m bit wide comparator 127 connected in parallel between the input port 8031 and 8032 and output port 8034. A multiplexer 131 is provided between the operation units 127 to 129 and output port 8034. An output from one of the operation units 127 to 129 is selected by the multiplexer 131 and output to the output port 8034.

In response to the instruction code supplied to the ALU 803 via the instruction decoder 802, by selecting the operation units 127 to 129 and input source for the multiplexer 131, the ALU 803 operates as various arithmetic operation units, logic operation unit, selector or comparator.

As described above, the array processor 8 includes a plurality of function blocks including the ALU 803 inside the processor element 81 and the internal wiring resource 805 for switching the connection between the function blocks. The array processor 8 further includes the programmable switches 15 for switching the connection between the processor elements 81. To be more specific, as against to the configuration of the reconfigurable device 7 shown in FIG. 22 in which the function blocks 70 are variably connected through the programmable switches 15, the array processor 8 has a hierarchized configuration by variable connections between the function blocks inside the processor elements 81 and variable connections between the function blocks between the processor elements 81.

The abovementioned reconfigurable device 7 and array processor 8 have an advantage of having better flexibility in the circuit configuration as compared to dedicated circuits such as ASIC and also have a disadvantage of having redundant reconfigurable circuit configuration. The reconfigurable device 7 and array processor 8 have a plurality of function blocks 70 and processor elements 81 that support for switching the circuit configuration, configuration memory 16 for storing circuit configuration information or instruction memory 801 and instruction decoder 802. Further, the programmable switches 15 for switching the connection relationship between the function blocks or processor elements require larger wiring area as compared to a wiring for the dedicated circuits. Therefore, to form a desired circuit by the reconfigurable device 7 or array processor 8, an integration degree is lower as compared to when forming the same circuit by a dedicated circuit, thereby reducing an area efficiency.

As an example, a comparison when a circuit for performing arithmetic operation of (A+B)*(C+D)→Y is formed by the reconfigurable device 7 and a dedicated circuit is shown in FIGS. 26A and 26B. FIG. 26A shows a circuit formed by the dedicated circuit. The circuit of FIG. 26A is comprised of an adding circuit 810a for calculating A+B, adding circuit 810b for calculating C+D and a multiplying circuit 811 for multiplying output data from the two adding circuits. On the other hand, FIG. 26B shows the configuration by the reconfigurable device 7. In such case, in addition to components which are programmable switches 15a to 15c for enabling to switch input data to function blocks 70a to 70c and operation units required to comprise the adding and multiplying circuits, other circuit components included in the function blocks 70a to 70c and configuration information memories 16a to 16c are required. Other circuit components included in the function blocks 70a to 70c and the configuration information memories 16a to 16c are redundant part when forming the circuit by the reconfigurable device 7.

Reconfigurable devices according to the related art including the abovementioned array processor 7 may not be able to achieve an efficient circuit in terms of area efficiency and processing speed, depending on content of application program and processing data.

As an example, a case is described in which the number of inputs to the function block 70 of the reconfigurable device 7 is increased in order to efficiently process multi-inputs that exceeds 2-input. FIG. 27 shows an example in which the function block 70 is made to be a function block for 4-input. The function block 70 shown in FIG. 27 includes a 4-input operation unit 110. Input data is supplied from four input ports 104a to 104d to the 4-input operation unit 110 and the operation result by the 4-input operation unit 110 is output from an output port 105 of the function block 70.

Increased number of inputs to the function block 70 is advantageous in light of improving operation speed. For example to realize a 4-input selector by a 2-input function block, three function blocks having 2-input selectors are required. As the connection between the function blocks are performed via a programmable switch, an operation speed is reduced due to signal delay in the programmable switch and wiring. On the other hand, when using the function block of 4-input shown in FIG. 27, it is possible to avoid reducing the operation speed caused from accumulation of wiring delays.

However increased number of input ports to the function block 70 in the reconfigurable device 7 results to increase the size of the programmable switch 15 for selecting input source for the input ports and configuration memory 16. In the case of FIG. 27, if the input ports to the function block 70 increases from 2-input to 4-input, the size of input selection unit 151 included in the programmable switch 15 doubles as compared to 2-input. This is because that the input source for the input ports 104a to 104d can be selected. Further, the size of the configuration memory 16 for storing configuration information of the input selection units 151a to 151d doubles as compared to 2-input.

Furthermore, this applies to addition and subtraction of data exceeding m bit. To add/subtract data exceeding m bit by combining m bit adder/subtracter, specifically to add/subtract with carry, a carry propagate is required between the m bit adder/subtracters. Therefore the plurality of function blocks 70 must be connected via the programmable switches 15 and this causes to reduce the operation speed due to wiring delays.

Thus as shown in FIG. 28, the adder/subtracter in the function block 70 is referred to as a 2 m bit wide adder/subtracter 122 that divides two $2m$ bit input data each into upper m bit and lower m bit and input from the four input ports 104a to 104d having m bit wide. Further, output data from the 2 m bit wide adder/subtracter is divided into upper m bit and lower m bit and output from output ports 105a and 105b. With this configuration, a carry propagate between the function blocks is unnecessary while using the programmable switch 15 having m bit wide and wiring resource.

However, as with the configuration to achieve the abovementioned 4-input selector, along with the increase of the number of input ports to the function block 70, size of the programmable switch 15 for selecting and configuration memory 16 also increases. Accordingly this increases hardware size of the reconfigurable device. The increase in the hardware size of the reconfigurable device causes to reduce integration degree of the reconfigurable device and further reduce area efficiency.

Note that even with increased number of input ports to the function block 70, by restricting the number of inputs of the programmable switch 15, it is possible to restrain from increasing the size of the programmable switch 15 and configuration memory 16. However in this way, flexibility of wiring between the function blocks 70 is limited, thereby constraining flexibility of changing circuit configuration.

As described above, we have now discovered a problem in the reconfigurable device according to the first related art in which along with the increase in the input port to the function block, the size of the programmable switch and configuration memory increases and the hardware size also increases.

Incidentally, such problem exists not only in the array processor 8 which is able to dynamically reconfigure depending on the application program. Specifically, this problem is common to reconfigurable integrated circuits having a configuration in which a connection relationship between function blocks are determined by a programmable switch such as a reconfigurable device capable of changing a connection relationship between function blocks including PLD (Programmable Logical Device) and FPGA (Field Programmable Gate array).

SUMMARY

In one embodiment of the present invention, a reconfigurable integrated circuit includes a plurality of function blocks and a plurality of programmable switches to switchably connect between function blocks included in the plurality of function blocks. The plurality of function blocks each includes at least one operation unit or one memory unit. The plurality of function blocks each includes at least one data input port connected to at least one of the plurality of programmable switches and at least one data output port connected to at least one of the plurality of programmable switches. Further, at least a pair of function blocks included in the plurality of function blocks is connected without intervening the programmable switch and data being output from a direct output port included in one of the pair of function blocks can be input to a direct input port included in the other of the pair of function blocks.

With such configuration, data can be input to a function block using a direct input port but not connected to a programmable switch. Thus even with increased number of data inputs to the function block, it is possible to restrain from increasing hardware size such as the size of programmable switch and configuration memory.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

Figure 1:
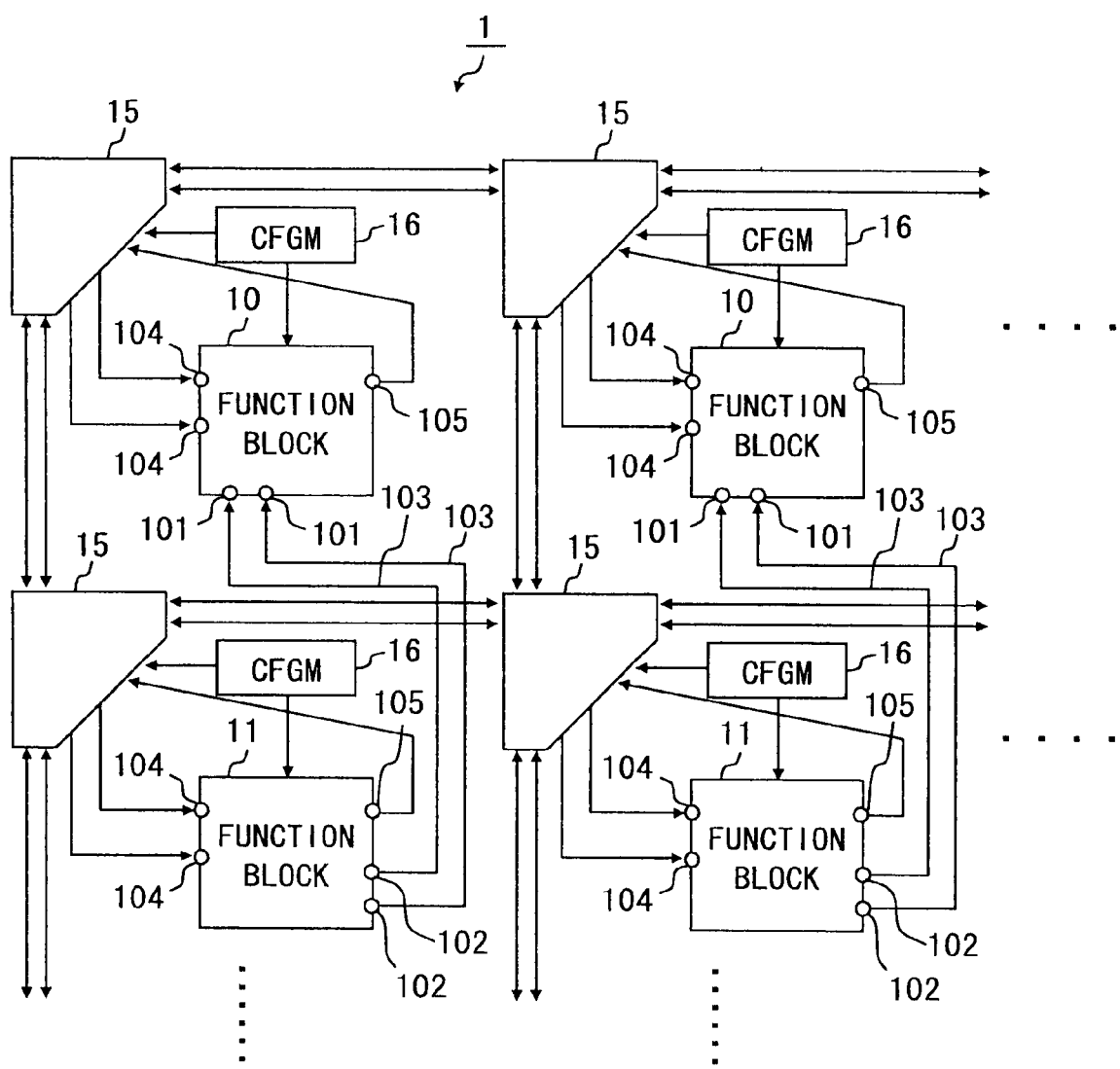
FIG. 1 is a block diagram of a reconfigurable device according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

The embodiments described hereinbelow are reconfigurable devices incorporating the present invention. In the description below, components identical to the components included in the reconfigurable device 7 or array processor 8 according to the related art are denoted by reference numerals identical to those therein with detailed description omitted.

First Embodiment

The configuration of a reconfigurable device 1 according to this embodiment is shown in FIG. 1. In addition to the input port 104 and output port 105 that are connected to the programmable switch 15, a function block 10 included in the reconfigurable device 1 has a direct input port 101 that is directly connected to other function blocks 11 without intervening the programmable switch 15. Further, in addition to the input and output ports connected to the programmable switch 15, the function block 11 has a direct output port 102 that is directly connected to other function block 10 without intervening the programmable switch 15. Further, the direct input port 101 in the function block 10 is connected to the direct output port 102 in the function block 11 by a direct line 103.

Figure 2:
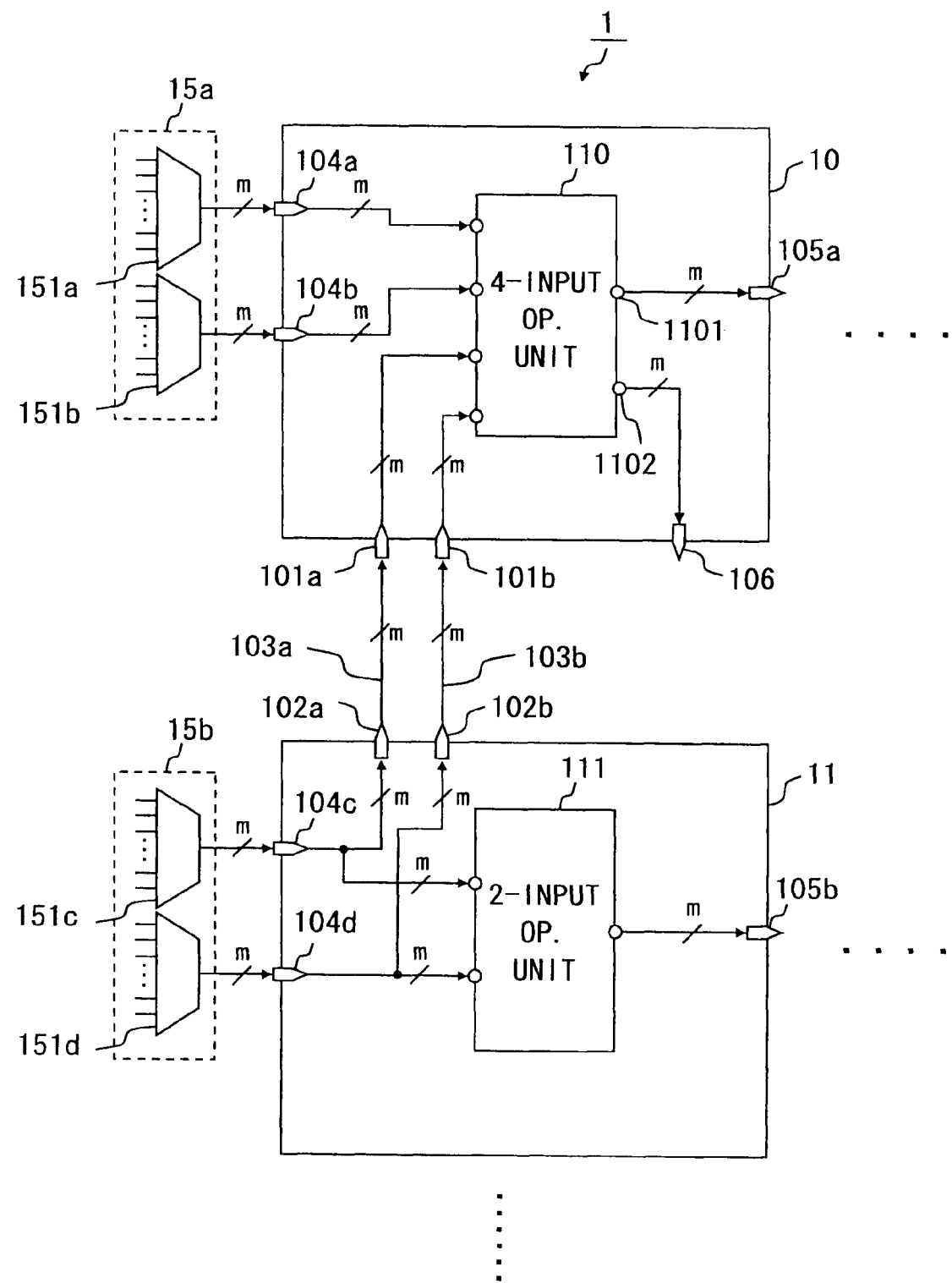
FIG. 2 shows a connection of function blocks in the reconfigurable device according to an embodiment of the present invention.

Detail of connection configuration of the function blocks 10 and 11 is shown in FIG. 2. In addition to the two input ports 104a and 104b having m bit wide that are connected with the programmable switch 15a, the function block 10 has direct input ports 101a and 101b having m bit wide that are connected to direct output ports 102a and 102b in the function block 11. Input data from the input ports 104a and 104b, and direct input ports 101a and 101b is input to the 4-input operation unit 110. The operation result output from an output port 101 of the 4-input operation unit 110 is input to the programmable switch 15 via an output port 105a. Further, an output port 1101 of the 4-input operation unit 110 is used for an operation result exceeding m bit and the result is output via an output port 106 in the function block and can be input to other function blocks. Usage pattern of the output port 106 is described later in detail.

On the other hand the function block 11 includes the two input ports 104c and 104d having m bit wide that are connected to a programmable switch 15b. Data input from the input ports 104c and 104d is input to a 2-input operation unit 111 and also output respectively from the direct output ports 102a and 102b.

As described above, in the reconfigurable device 1 of this embodiment, not all the input and output ports included in the plurality of the function blocks 10 and 11 are connected to the programmable switches 15 but at least a part of the function blocks are connected without intervening the programmable switches 15 by the direct lines 103 that directly connect between the function blocks.

With this configuration, data can be input to the function block 10 from the direct input port 101 that is not connected to the programmable switch 15. Thus even if the number of data input to the function block 10 increases, it is possible to restrain from increasing hardware size such as the size of the programmable switch 15 and configuration memory 16.

Incidentally, as for input to the direct input port 101, the input source can be selected by the programmable switch 15b that is connected to the function block 11 upstream of the direct input port 101. Accordingly, while restraining from increasing hardware size, limitation in the flexibility of the lines between the function blocks can be reduced as well.

Figure 3:
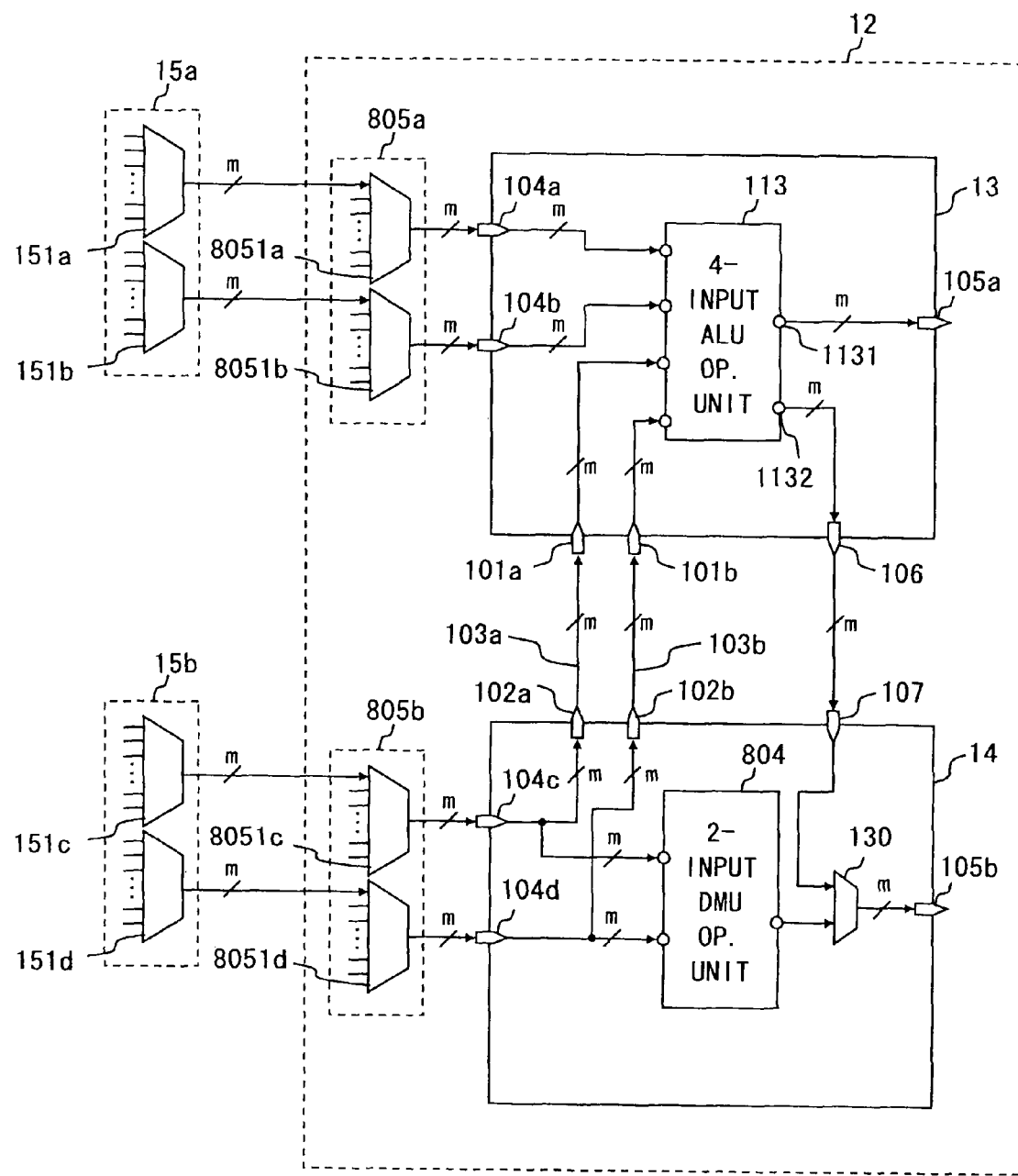
FIG. 3 is a block diagram of the reconfigurable device according to an embodiment of the present invention.

FIG. 3 shows a configuration example of a processor element in which the configuration of the reconfigurable device 1 according to this embodiment is incorporated to the array processor of the first related art. A processor element 12 in FIG. 3 includes 4-input ALU 13 corresponding to the above-mentioned function block 10 and 2-input DMU 14 corresponding to the function block 11. Note that in FIG. 3, the instruction memory 801 and instruction decoder 802 are not illustrated. As the functions are same as the instruction memory 801 and instruction decoder 802 included in the processor element 81 mentioned above, the explanation is omitted here. The ALU 13 includes the direct input port 101a and 101b and is connected to the DMU 14 by direct lines 103a and 103b. Data input from the direct input ports 101a and 101b and data input from the input ports 104a and 104b that are connected to the programmable switch 15a via the internal wiring resource 805a is input to the 4-input ALU operation unit 113.

The DMU 14 outputs the data input from the programmable switch 15b via the internal wiring resource 805b and includes the output ports 102a and 102b that are connected to the direct input ports 101a and 102b of the ALU 13.

Incidentally, the 4-input operation unit 113 includes two output ports 1131 and 1132. Output data when the 4-input ALU operation unit 113 is operating as a 4-input selector for selecting one from four m bit input data is m bit. In such case, m bit data output from the output port 1131 of the 4-input ALU operation unit 113 is input to the programmable switch 15 via the output port 105a of the ALU 13.

On the other hand, when the 4-input ALU operation unit 113 operates as a 2 m bit wide adder/subtracter, the output data has 2 m bit wide. In this way, if the data wide of the output data from the 4-input ALU operation unit 113 exceeds m bit, the output data is divided into upper and lower m bits, and one (for example the lower m bits) is output from the output port 1131 while another (for example the upper m bits) is output from the output port 1132. The data output from the output port 1132 is output to the output port 106 of the ALU 13 and input to an input port 107 of the DMU 14. The data input from the input port 107 is input to a multiplexer 130. By the multiplexer 130 selecting input data from the input port 107, a part of the output data (for example upper m bits) of the 4-input ALU operation unit 113 can be output from the output port 105b of the DMU 14. With this configuration, a part of the output data (for example the upper m bits) of the 4-input ALU operation unit 113 can be supplied to other processor element via the DMU 14 and the programmable switch 15.

Figure 4:
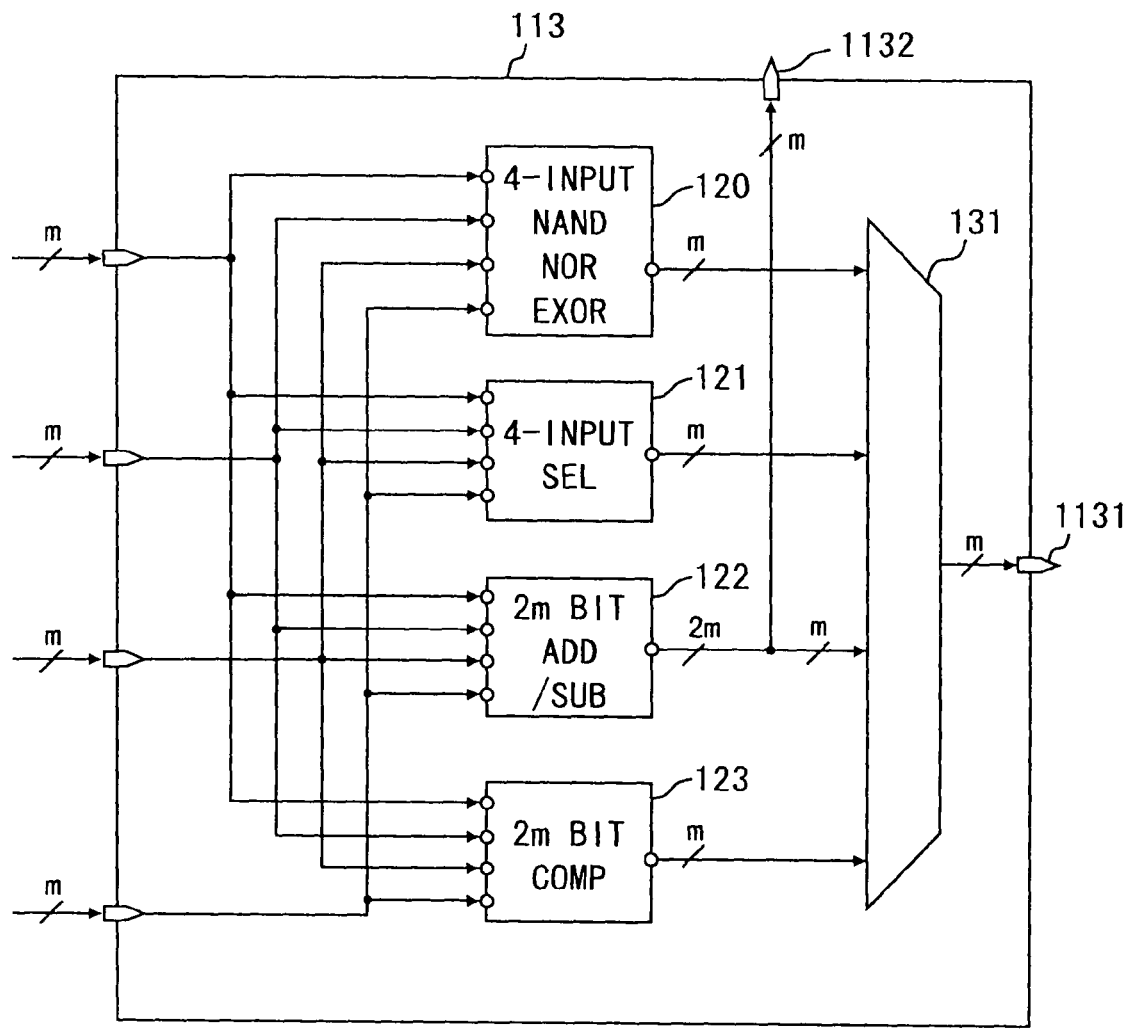
FIG. 4 shows a configuration example of an ALU operation unit.

A configuration example of the 4-input ALU operation unit 113 included in the ALU 13 is shown in FIG. 4. The 4-input ALU operation unit 113 is a combination of a 4-input logic operation unit 120, 4-input selector 121, 2 m bit wide adder/subtracter 122 and 2 m bit wide comparator 123 and includes a multiplexer 131 for outputting one of outputs from the operation units 120 to 123. Further, the output port 1132 is disposed to output upper m bit or lower m bit among the 2 m bit wide output data of the 2 m bit wide adder/subtracter.

Figure 5:
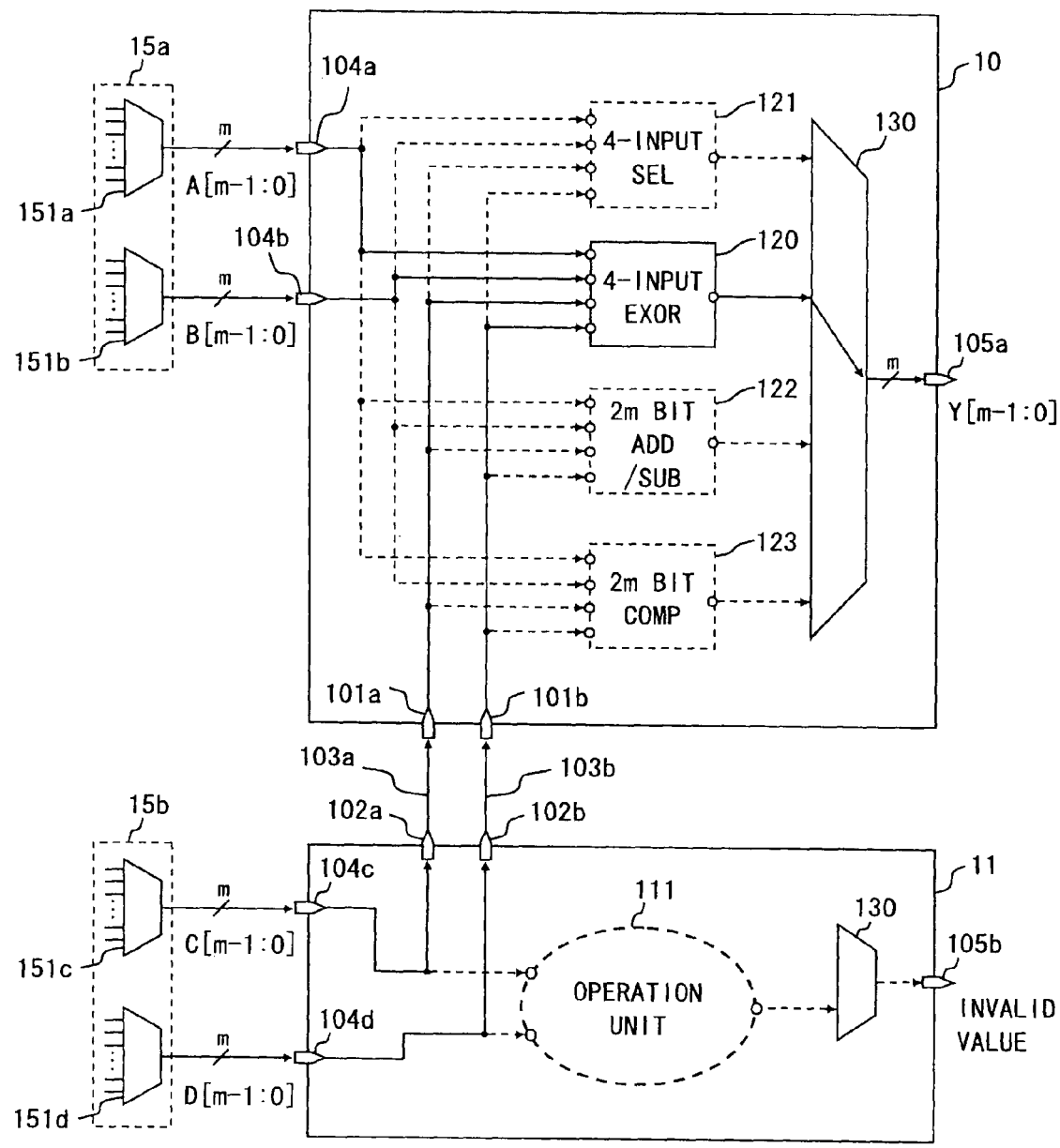
FIG. 5 is a block diagram for achieving a 4-input logic operation in the reconfigurable device according to an embodiment of the present invention.

Advantages of the reconfigurable device 1 having the function blocks 10 and 11 that are connected by the direct lines 103 are described in detail hereinafter with reference to FIGS. 5 to 7. FIG. 5 shows the configuration to achieve a 4-input logic operation using the function block 10. Specifically, an exclusive OR operation for four values A, B, C and D (A^b^C^D→Y) is performed.

Four values A, B, C and D that are input from the m bit wide input ports 104a and 104b connected to the programmable switch 15a and the m bit wide direct input ports 101a and 101b are input to the 4-input logic operation unit 120. Among the four values, C and D that are input to the direct input ports 101a and 101b are the values output from the direct output ports 102a and 102b of another function block 11. Further, the direct output ports 102a and 102b are connected to the input ports 104c and 104d for inputting data from the programmable switch 15b.

With this configuration, the input source for the four data A to D that are to be performed a logic operation can be freely selected by the control of the programmable switches 15a and 15b. Specifically, the programmable switch 15b connected to the function block 11 can be used as a switch for selecting input data to the function block 10. As described above, by the configuration connecting the function blocks 10 to the function block 11 directory, it is possible to achieve a reconfigurable device capable of 4-input processing without increasing the number of input ports of the programmable switch 15a that is connected to the function block 10 for performing a 4-input logic operation and the number of input selection units 151 and also without losing flexibility to select data input source.

Figure 6:
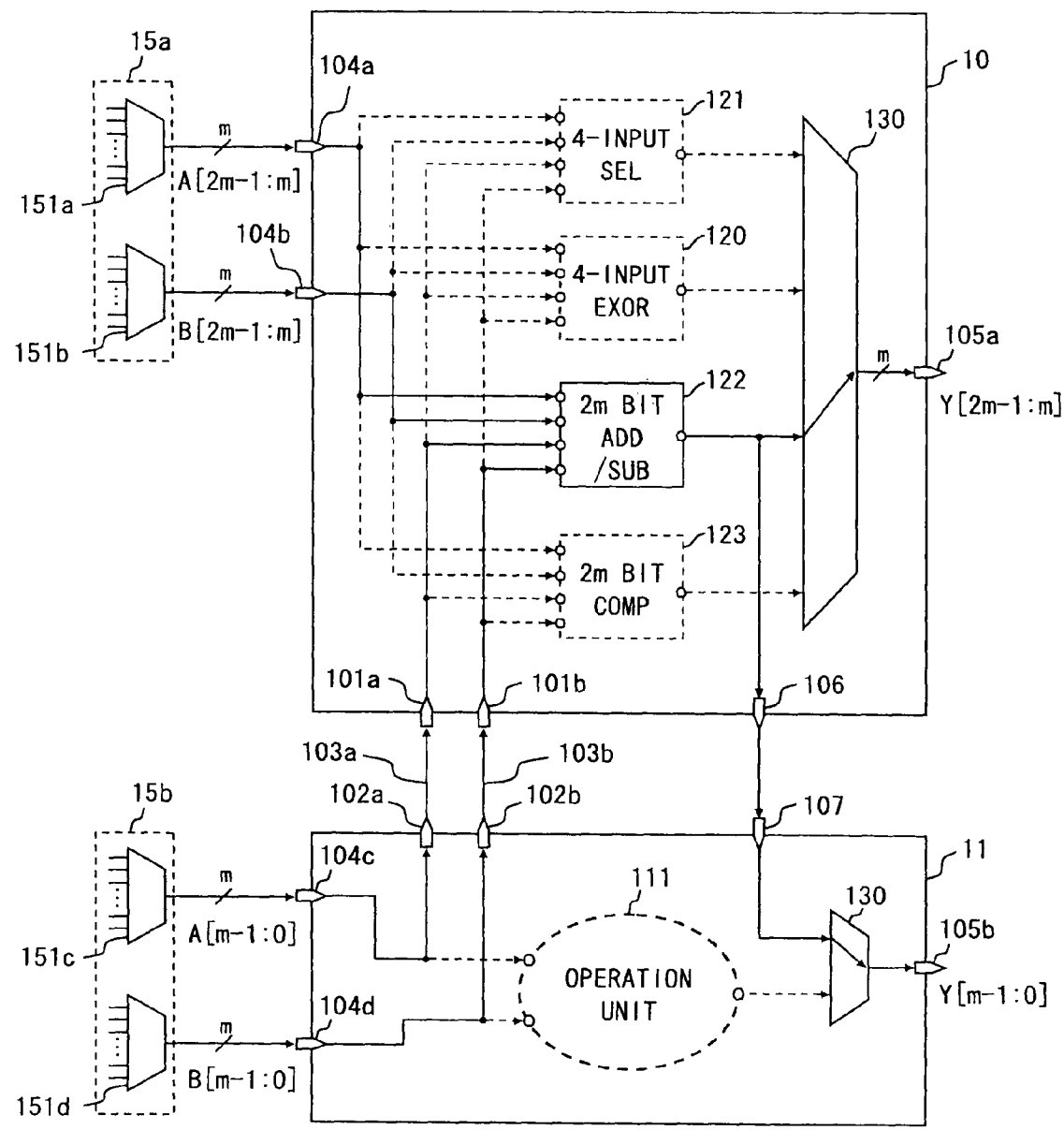
FIG. 6 is a block diagram for achieving a 2 m bit addition/subtraction in the reconfigurable device according to an embodiment of the present invention.

FIG. 6 shows the configuration to realize 2m bit addition (A+B→Y) by the function block 10. Upper m bit A [2 m−1:m] of the 2 m bit wide input data A and upper m bit B [2 m−1:m] of the 2 m bit input data B are input to the input ports 104a and 104b. On the other hand, lower m bits A [m−1:0] and B [m m−1:0] of A and B are input to the input ports 104c and 104d of the function block 11. Further, the lower m bit A [m−1:0] and B [m−1:0] are input to the direct input ports 101a and 101b via the direct output ports 102a and 102b. These four input data is input to the 2 m bit wide adder/subtracter 122. Upper m bit Y [2 m−1:m] of an operation result Y from the 2 m bit wide adder/subtracter 122 is output to the output port 105a of the function block 10. Further, lower m bit Y [m−1:0] is output to the output port 106. Here, by configuring the multiplexer 130 of the function block 11 to be able to select data input from the input terminal 107, the lower m bit of the operation result Y from the 2 m bit wide adder/subtracter 122 can be output from the output port 105b of the function block 11. Incidentally, the lower m bit Y [m−1:0] may be output from the output port 105a and the upper m bit Y [2 m−1:m] may be output from the output port 105b.

With this configuration, the programmable switch 15b that is connected to the function block 11 can be used as a switch for selecting the input data to the function block 10. Further, it is possible to achieve a reconfigurable device capable of 4-input processing without increasing the number of input ports of the programmable switch 15a that is connected to the function block 10 for performing a 4-input logic operation and the number of input selection units 151 and also without losing flexibility to select data input source.

Furthermore, by the configuration to enable outputting a part of the output data of the function block 10 to the output port 105b of another function block 11, an operation result exceeding m bit can be divided and output without increasing the number of input ports of the programmable switch 15 that is to be connected to the output port of the function block 10.

Figure 7A:
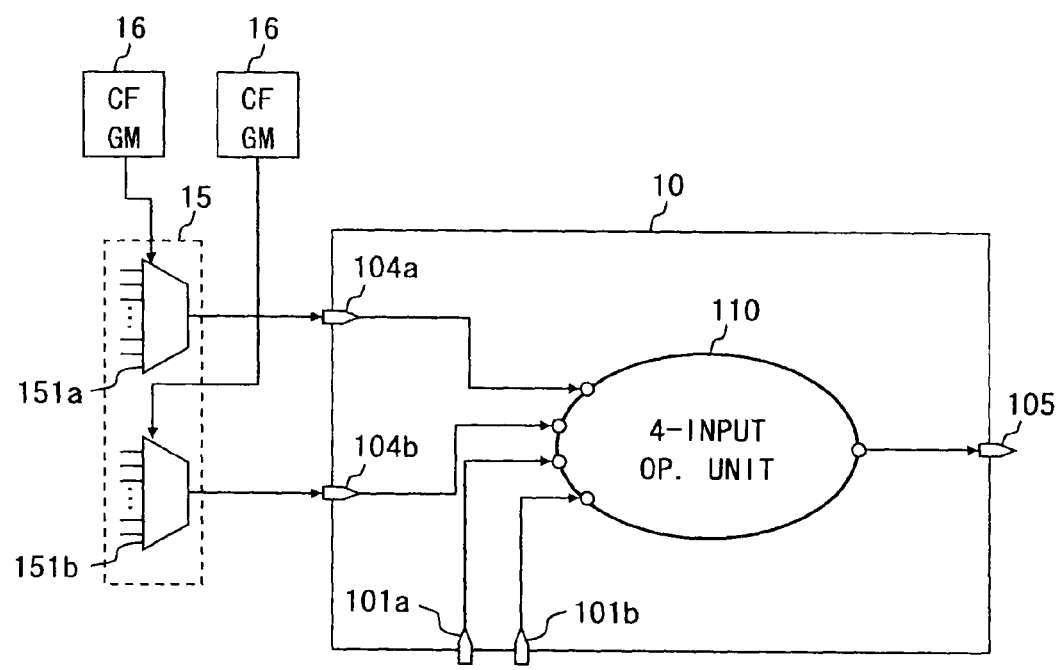
FIGS. 7A and 7B show the relationship between increases of the number of input ports to a function block included in the reconfigurable device and a device size according to an embodiment of the present invention.

FIG. 7A shows the function block 10 including the 4-input operation unit 110, the programmable switch 15 for supplying input data to the function block 10 and configuration memory 16. To make the function block 70 included in the reconfigurable device 7 of the related art to execute 4-input processing, the size of the input selection units 151 included in the programmable switch 15 needs to be doubled as compared to 2-input, so as to enable selecting an input source for the input ports 104a to 104d. On the other hand, the function block 10 of FIG. 7A can use the programmable switch connected to other function block 11 to select data input to the direct input ports 101a and 101b. Thus even when increasing the input ports to have 4 inputs to the function block, the sizes of the programmable switch 15 and configuration memory 16 need not to be increased from the configuration for 2-input.

Figure 7B:
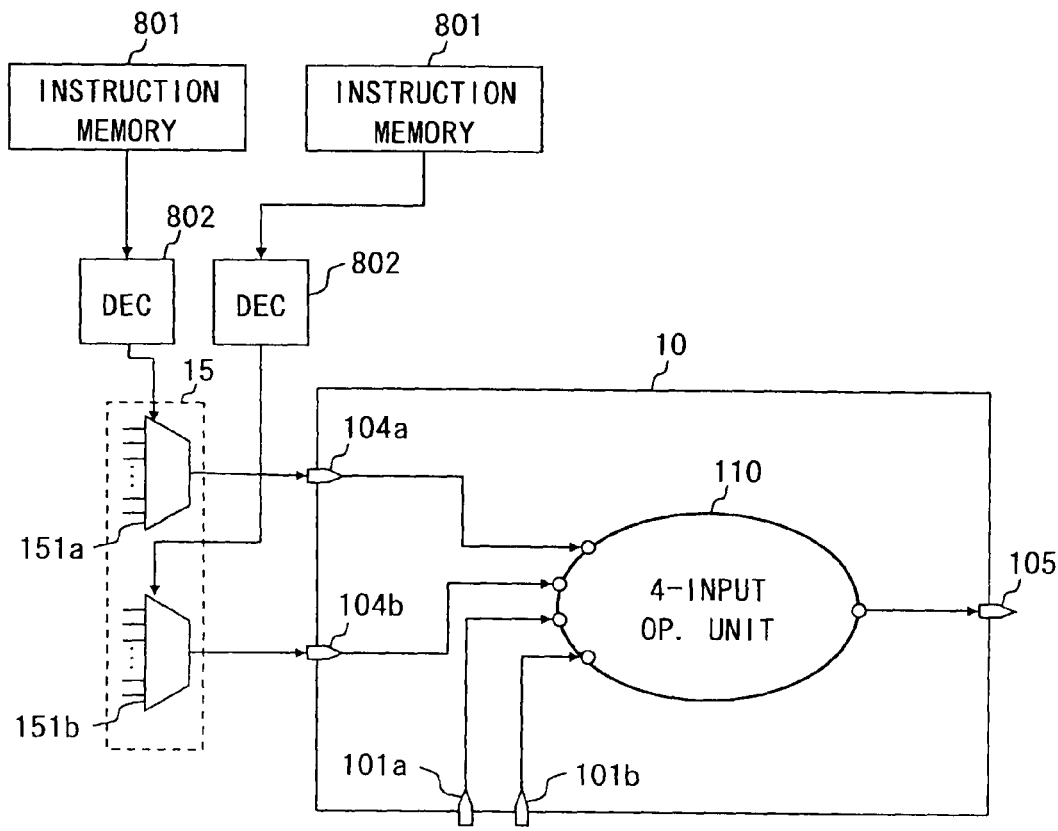

FIG. 7B shows an example in which a similar configuration as in FIG. 7A is incorporated to the array processor of the first related art. In this case also, when increasing the input ports to the function block 10 to have 4 inputs, the size of the programmable switch 15, instruction memory 801 and instruction decoder 802 needs not to be increased as compared to the configuration for 2-input.

Further, when using the function block 10 to process multi-input exceeding 2-input or data wide exceeding m bit, the programmable switch 15 connected to other function block 11 can be used to select an input source to the direct input port of the function block 10. Accordingly the function block 11 cannot be used for operation. However, considering that three function blocks are required originally to perform a 4-input operation by 2-input operating units, with the configuration of this embodiment that enables a 4-input operation by two function blocks 10 and 11, use efficiency of the function blocks can be improved.

Further, to use the function block 10 for a 3-input operation, only one input of the function block 11 may be output to the direct line 103. Thus in addition to supplying data to the direct input port of the function block 10 to perform a 3-input operation, the function block 11 can be used as a 1 input operation unit.

Figure 27:
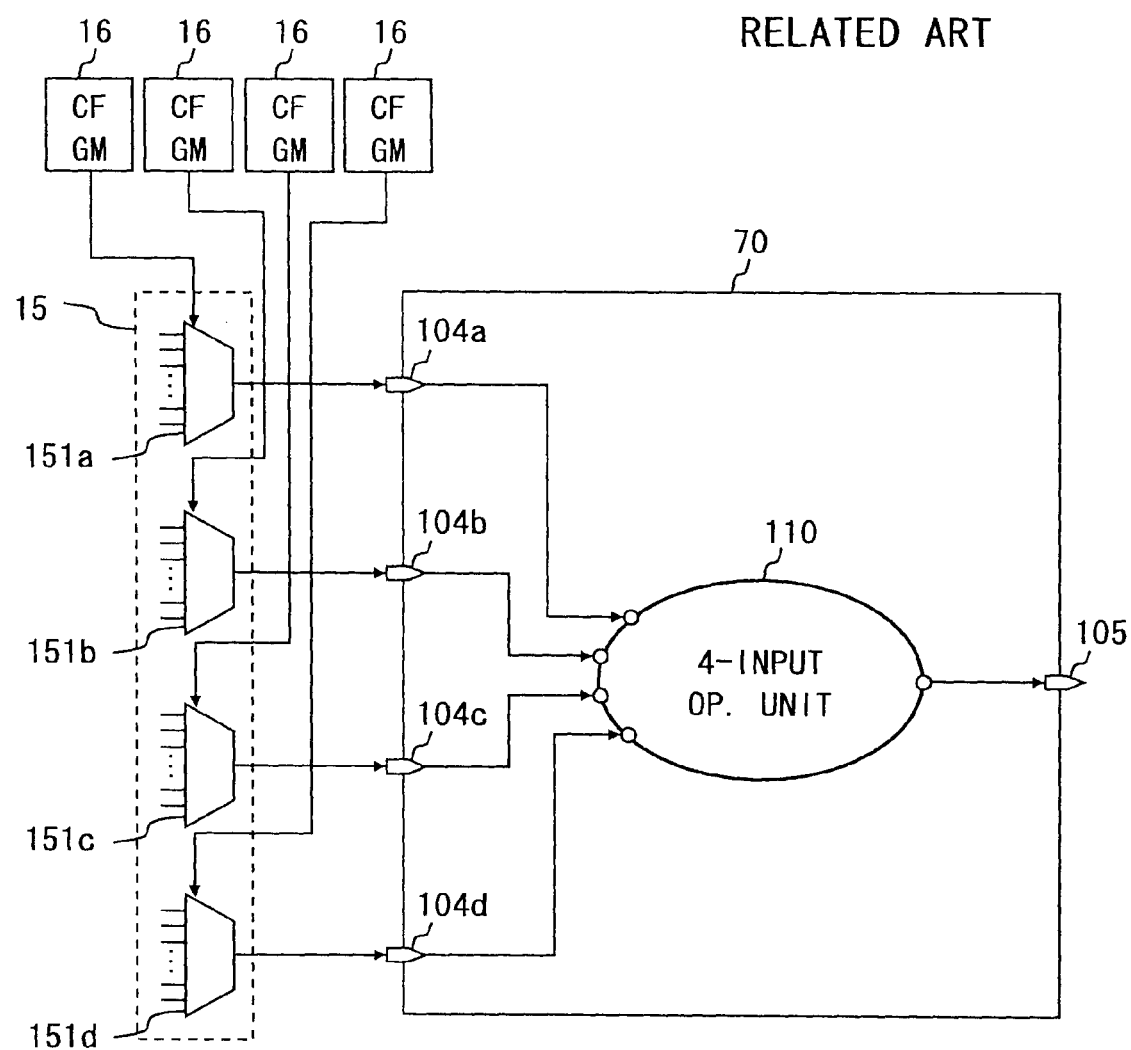
FIG. 27 shows the relationship between increases of the number of input ports to a function block included in the reconfigurable device of the related art and a device size.
Figure 28:
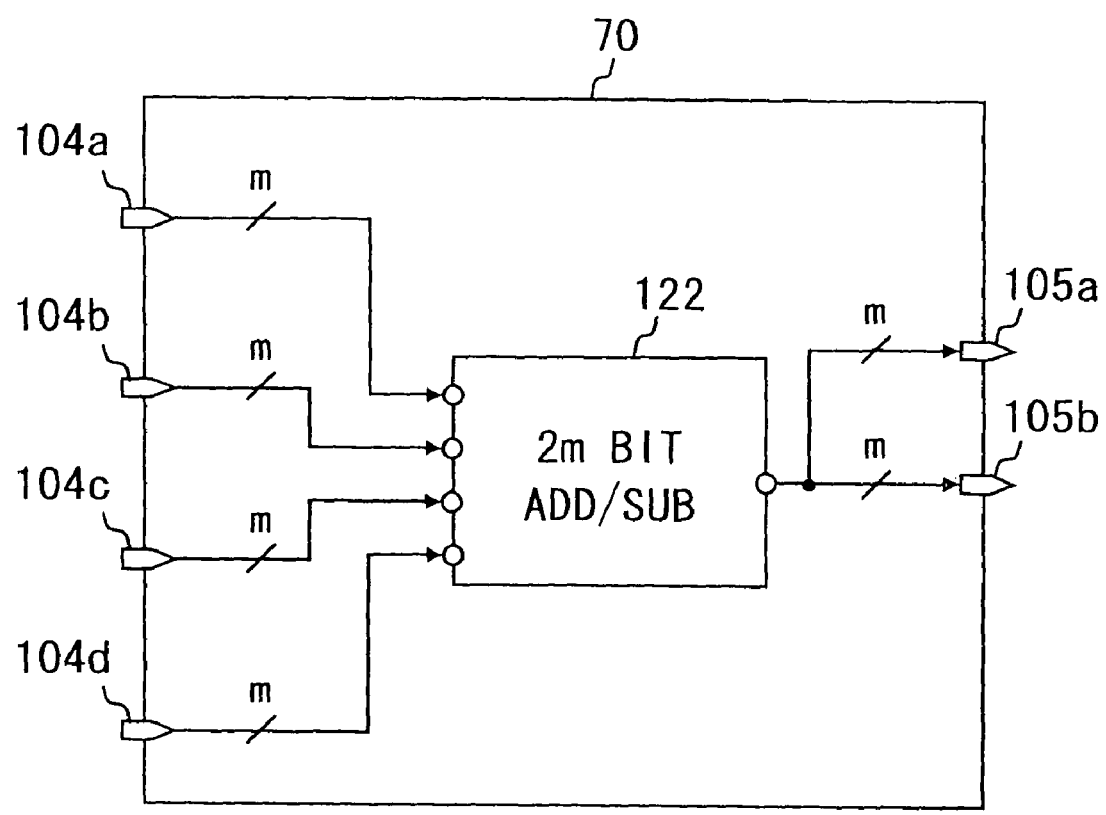
FIG. 28 is a block diagram of a function block for achieving an operation unit having 2 m bit wide in the reconfigurable device according to the related art.

Furthermore, when using the function block 10 for a 2-input operation, the direct input port 101, direct output port 102 and direct line 103 becomes redundant, where the components are provided to make the function block 10 have 4 input. However, the degree of redundancy is minor in comparison to the configuration to increase the size of the programmable switch 15 as shown in FIG. 27.

In this embodiment, a case is described in which the number of input ports is increased from 2 to 4 ports in order to perform an arithmetic operation of 4-input operation or 2 m bit addition or the like in the function block 10. However the present invention is not limited to this configuration but is widely effective to configurations having any number of input port.

Moreover, the operation unit included in the function blocks 10 and 11 shown in FIGS. 5 and 6 are illustrative only and various combinations of operation units can be considered depending on a function to be achieved by the reconfigurable device 1. For example multi-input operation units including an adder/subtracter, saturation calculation unit, comparator, multiplier, divider, logic operation unit, selector, barrel shifter, bit mask unit and Galois field multiplier or an operation unit combining these operation units may be included in the function blocks 10 and 11.

Second Embodiment

Figure 8:
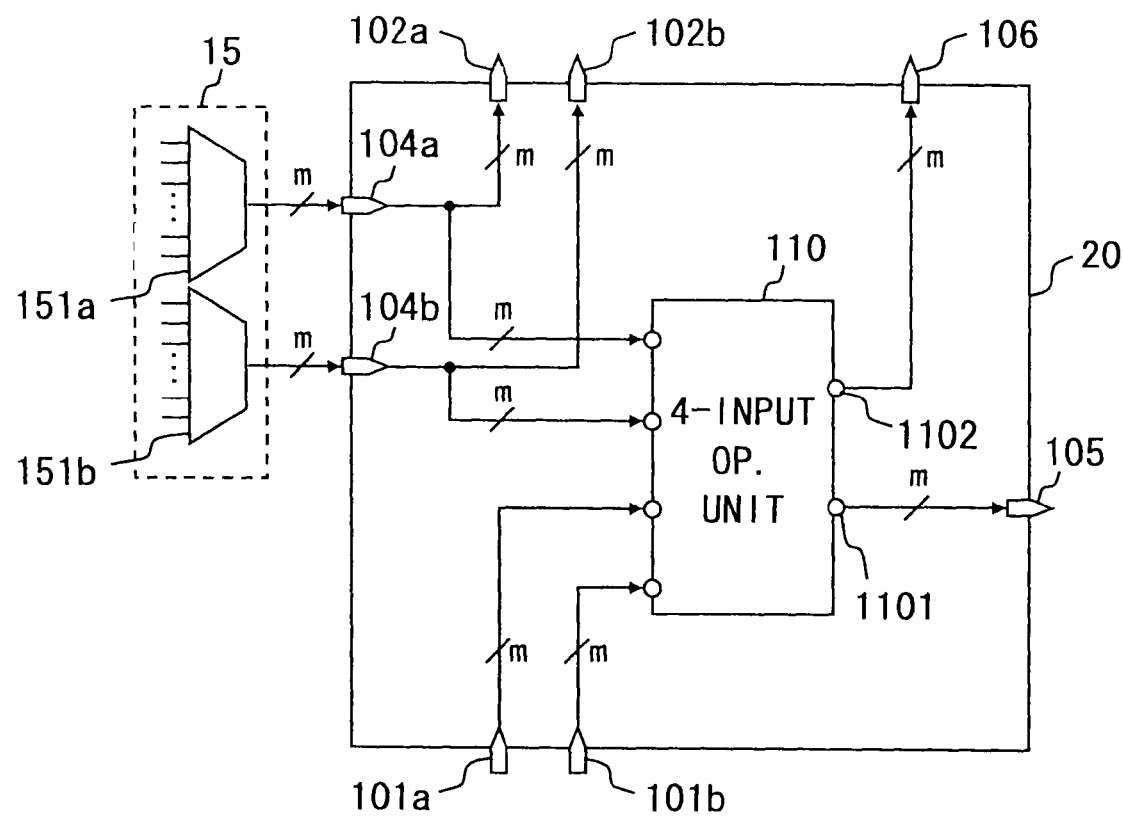
FIG. 8 is a block diagram of a function block included in a reconfiguration device according to an embodiment of the present invention.

FIG. 8 shows the configuration of a function block 20 included in a reconfigurable device 2 according to this embodiment. The reconfigurable device 1 explained in the first embodiment includes the function block 10 for performing a multi-input operation and the function block 11 having the direct output port 102 for supplying data to the direct input port 101 of the function block 10. On the other hand, the function block 20 included in the reconfigurable device 2 of this embodiment has both the direct input port 101 and direct output port 102. Note that as the components included in the function block 20 are same as the components included in the function block 10 or 11, they are denoted by reference numerals identical to those therein with detailed description omitted.

Figure 9:
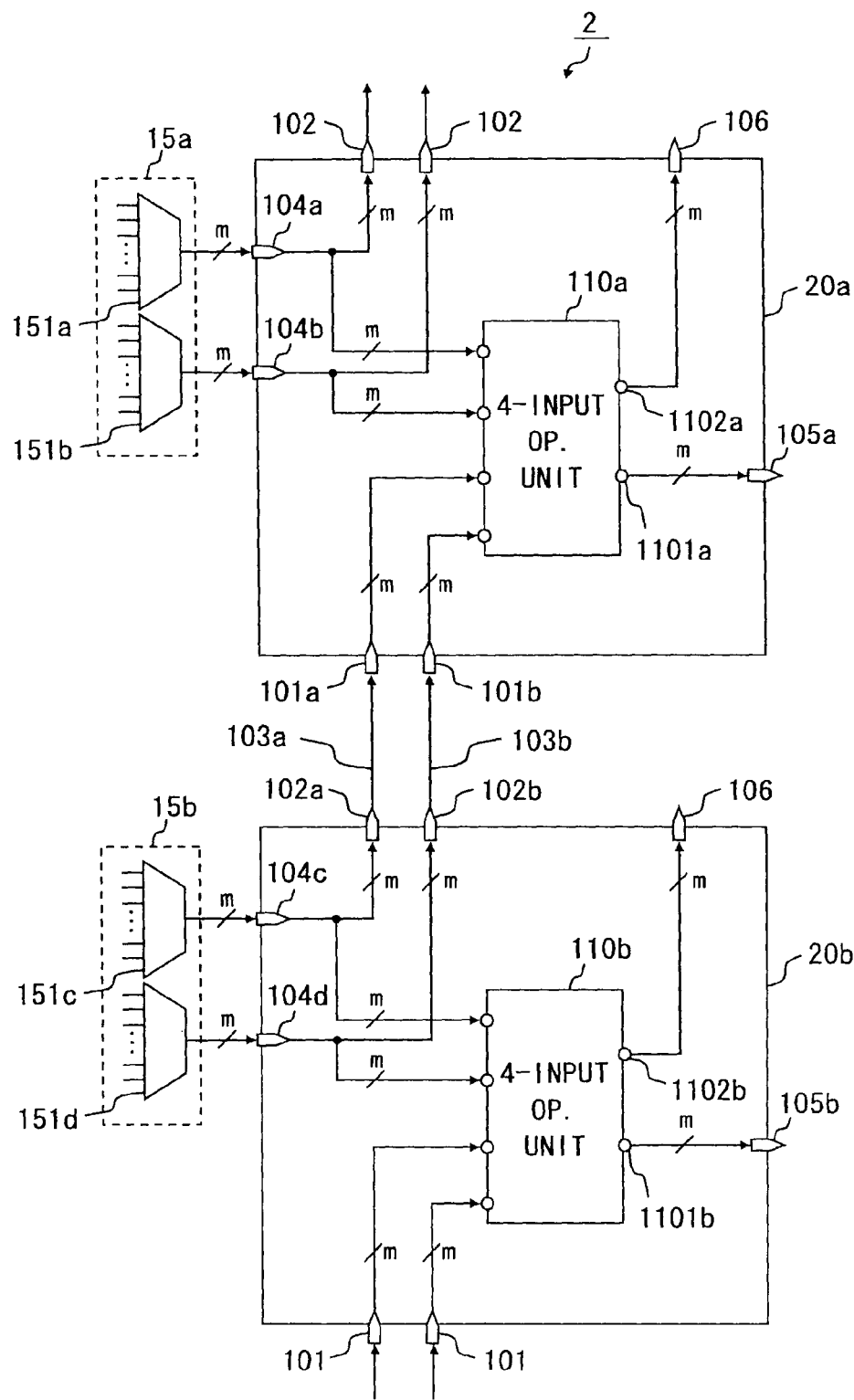
FIG. 9 shows a connection of function blocks of a reconfigurable device according to an embodiment of the present invention.

FIG. 9 shows the configuration example of the reconfigurable device 2 that includes directly connected function blocks 20. When using a function block 20a for 4-input operation, a part of input data to a 4-input operation unit 110 is supplied by the data output from direct output ports 102a and 102b and input to the direct input ports 101a and 101b. With this configuration, as with the reconfigurable device 1 of the first embodiment, the function block 20b connected to the programmable switch 15b is able to select an input source of data to the direct input ports 101a and 101b.

Figure 10:
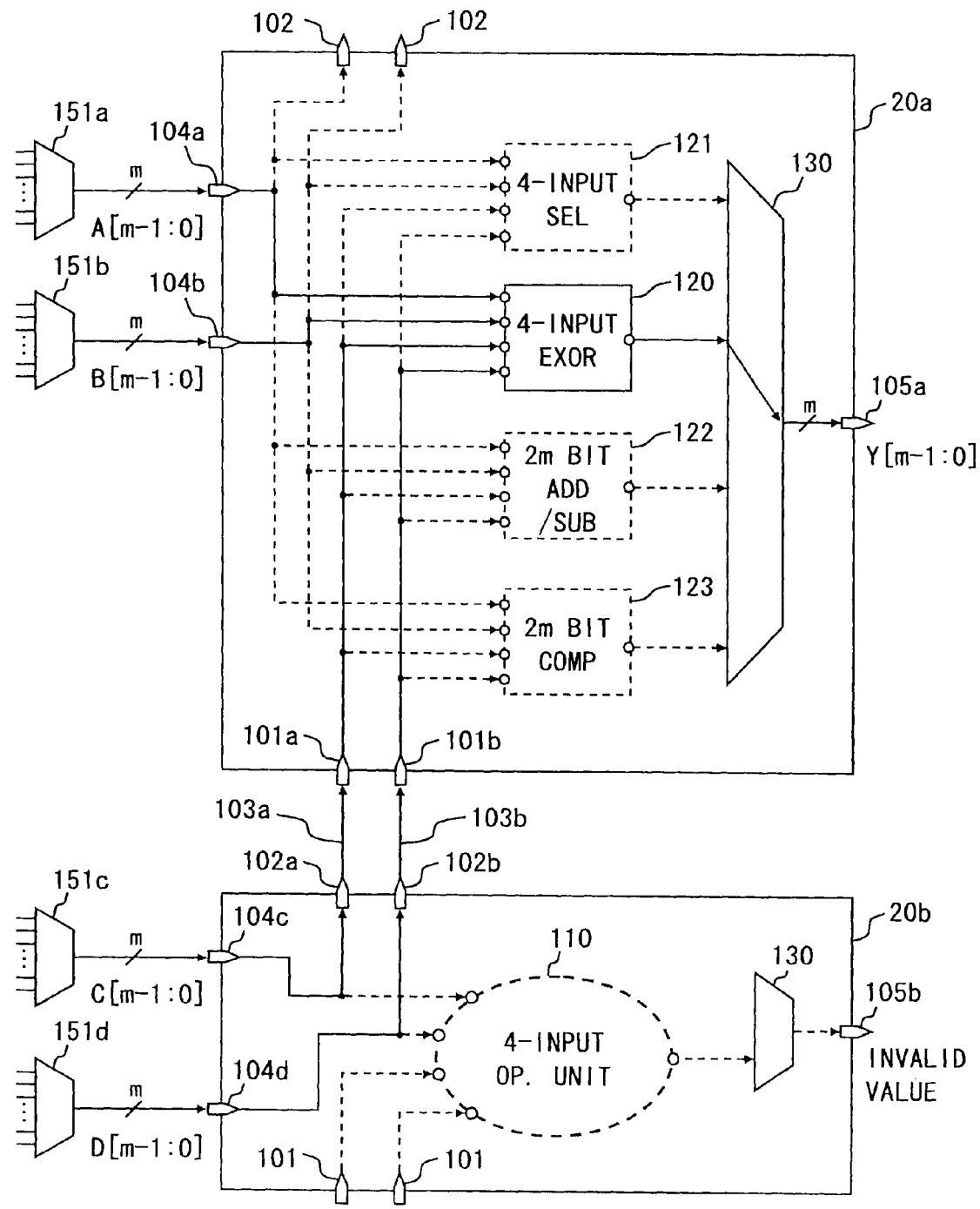
FIG. 10 is a block diagram for achieving a 4-input logic operation in the reconfigurable device according to an embodiment of the present invention.
Figure 11:
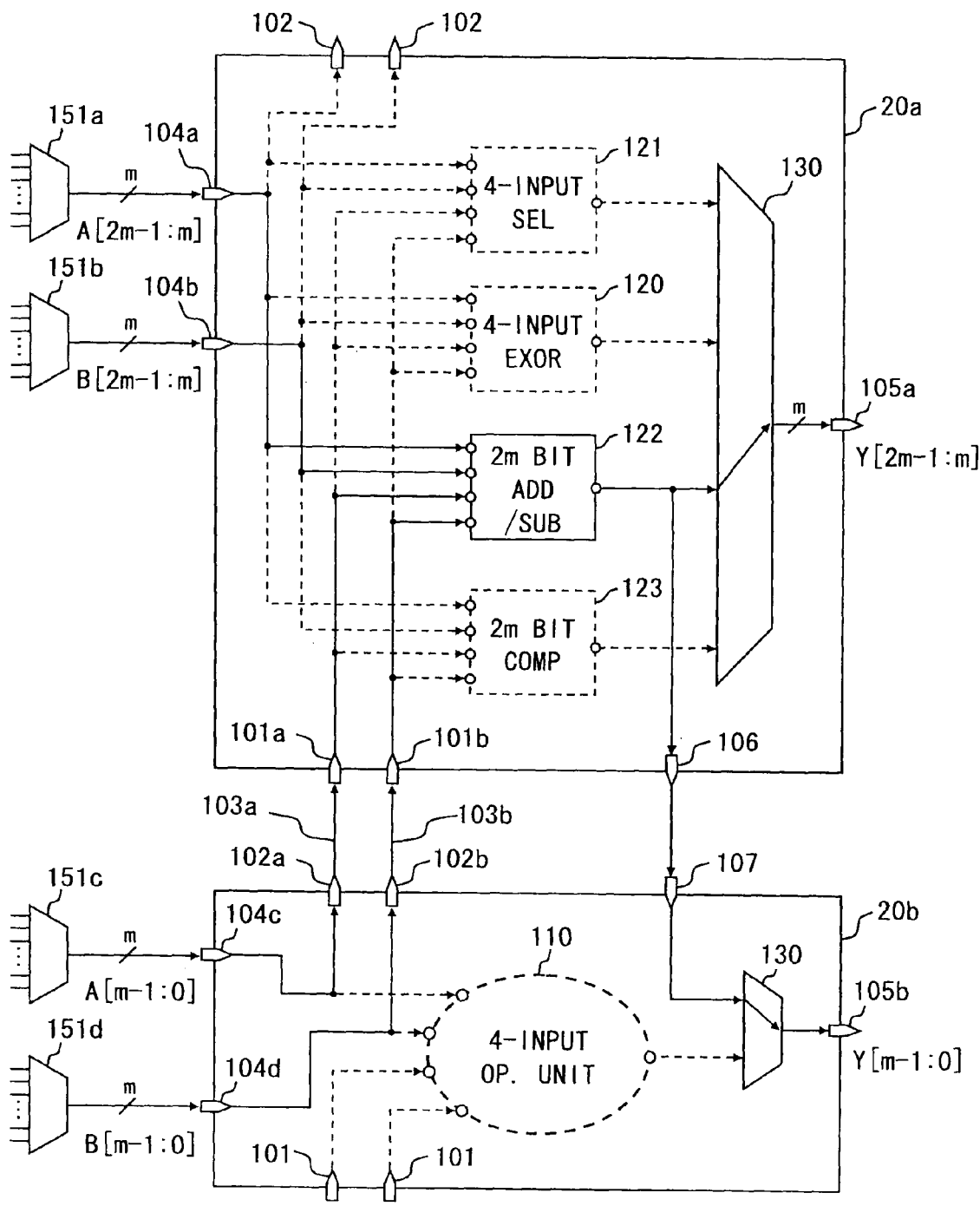
FIG. 11 is a block diagram for achieving a 2 m bit addition/subtraction in the reconfigurable device according to an embodiment of the present invention.

FIG. 10 shows the configuration for performing an operation of an exclusive OR operation for m bit data A to D that are input the input ports 104a and 104b of the function block 20a and the input ports 104c and 104d of the function block 20b using the 4-input logic operation unit 120 included in the function block 20a. Further, FIG. 11 shows the configuration for performing a 2 m bit addition using the 2 m bit wide adder/subtracter 122 included in the function block 20a. These configurations correspond to the configuration explained with reference to FIGS. 5 and 6 in the first embodiment. By connecting between the function blocks 20 of this embodiment by direct lines 103, same operation can be achieved as with when connecting between the function blocks 10 and 11 in the first embodiment by the direct lines 103. Thus it is possible to restrain from increasing the size of the programmable switch 15 and configuration memory 16.

Incidentally, the reconfigurable device 1 of the first embodiment needs to process a multi-input or multi-bit wide operation by combining the function block 10 having the direct input port 101 and function block 11 having the direct output port 102. On the other hand, in the reconfigurable device 2 of this embodiment, as one function block 20 includes the direct input port 101 and direct output port 102, flexibility in the combination of the function blocks for performing a multi-input or multi-bit wide operation is better as compared to the reconfigurable device 1.

Third Embodiment

Figure 12:
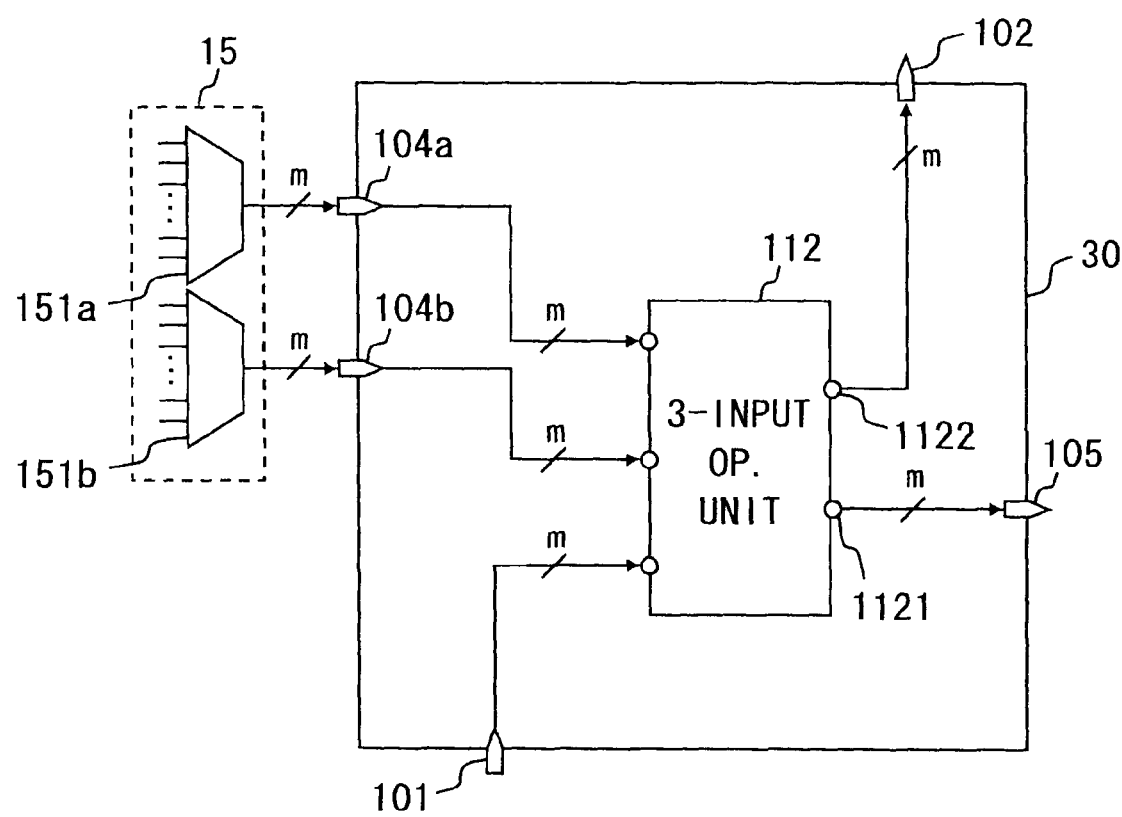
FIG. 12 is a block diagram of a function block included in a reconfiguration device according to an embodiment of the present invention.

FIG. 12 shows the configuration of a function block 30 included in a reconfigurable device 3 according to this embodiment. The function block 30 includes a 3-input operation unit 112. Incidentally, components identical to those in the reconfigurable device 1 of the first embodiment or the reconfigurable device 2 of the second embodiment are denoted by reference numerals identical to those therein with detailed description omitted.

The 3-input operation unit 112 is comprised of a 3-input operator or a combination of the 3-input operator and 2-input operator. The function block 30 performs an operation using data being input from the input ports 104a and 104b and the direct input port 101 according to the content of the configuration memory 16.

Figure 13:
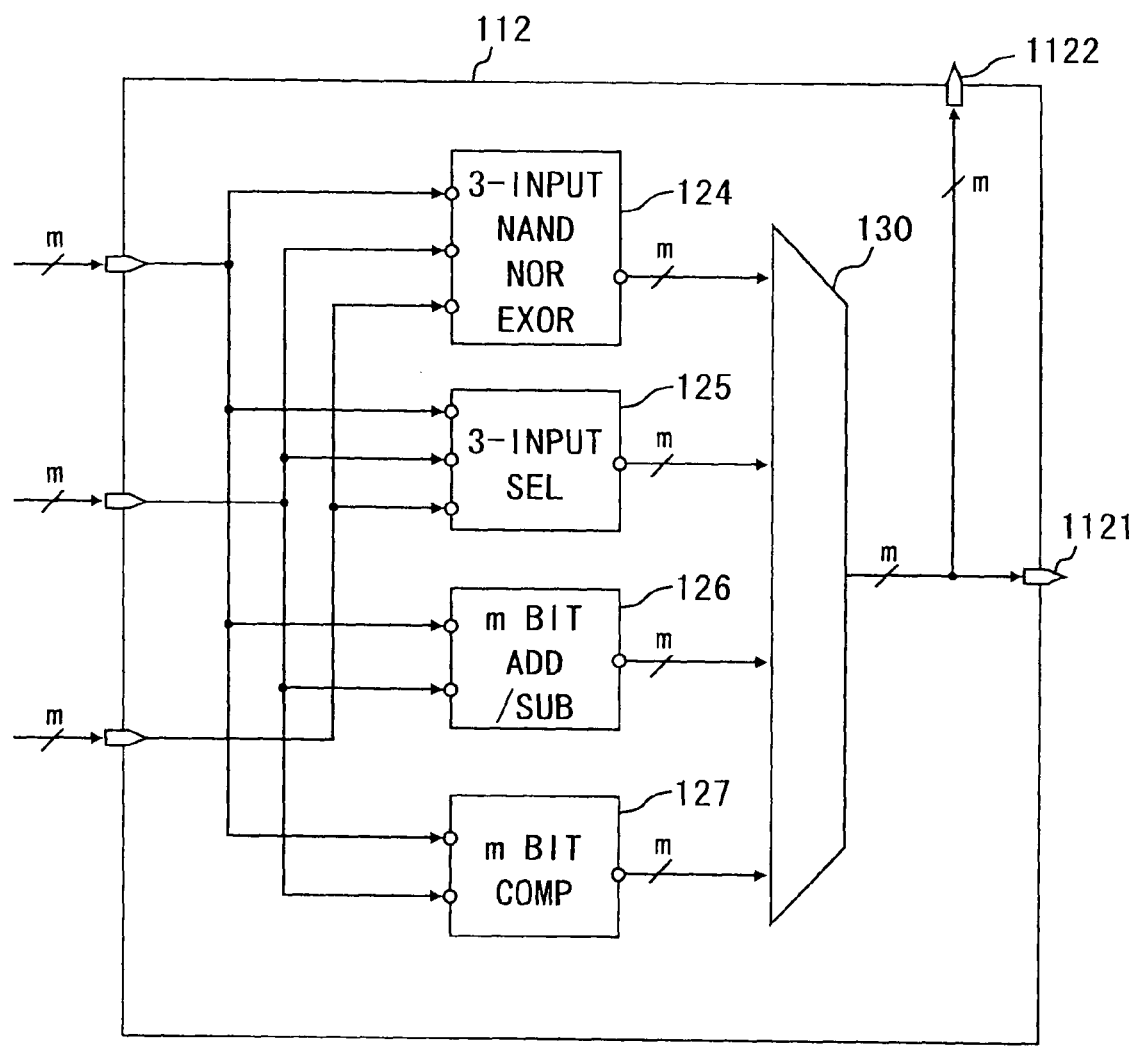
FIG. 13 shows a configuration example of a 3-input operation unit.

A configuration example of the 3-input operation unit 112 is shown in FIG. 13. The 3-input operation unit 112 of FIG. 13 includes a 3-input logic operation unit 124 configured d to perform a logic operation using three m bit wide data, 3-input selector 125 capable of inputting three m bit wide data, m bit wide adder/subtracter 126 and m bit wide comparator 127. The multiplexer 130 selects one of outputs from the operation units 124 to 127 to output. The output data from the multiplexer 130 is output to output ports 1121 and 1122.

Turning now to FIG. 12, the function block 30 includes the input ports 104a and 104b connected to the programmable switch 15 and the direct input port 101 connected to a direct output port of another function block. These three input ports 104a, 104b and 101 are connected to input ports of the 3-input operation unit 112.

Further, the output port 1121 for outputting the operation result of the 3-input operation unit 112 is connected to the output port 105 of the function block 30. The output port 105 is connected to the programmable switch. Furthermore, the function block 30 includes the direct output port 102 that is connected to another function block without intervening the programmable switch. The direct output port 102 is connected to the output port 1122 of the 3-input operation unit 112.

Figure 14:
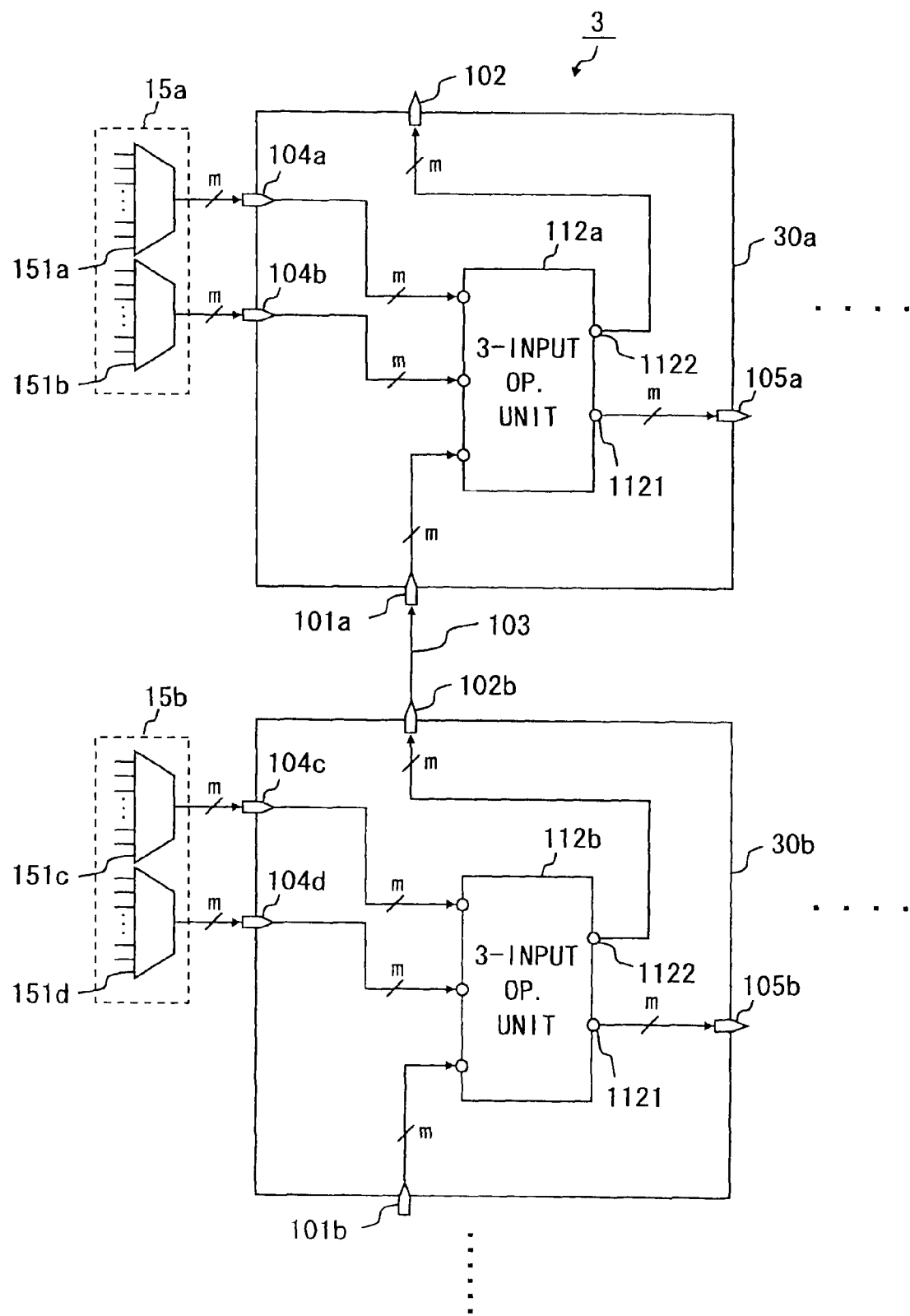
FIG. 14 shows a connection of function blocks of the reconfigurable device according to an embodiment of the present invention.

Next, FIG. 14 shows the configuration example of the reconfigurable device 3 having directly connected function blocks 30. When using the function block 30a for a 3-input operation, a part of the input data to the 3-input operation unit 112a is supplied by the data output from direct output port 102a of other function block 30b and input to the direct input port 101a.

Figure 16:
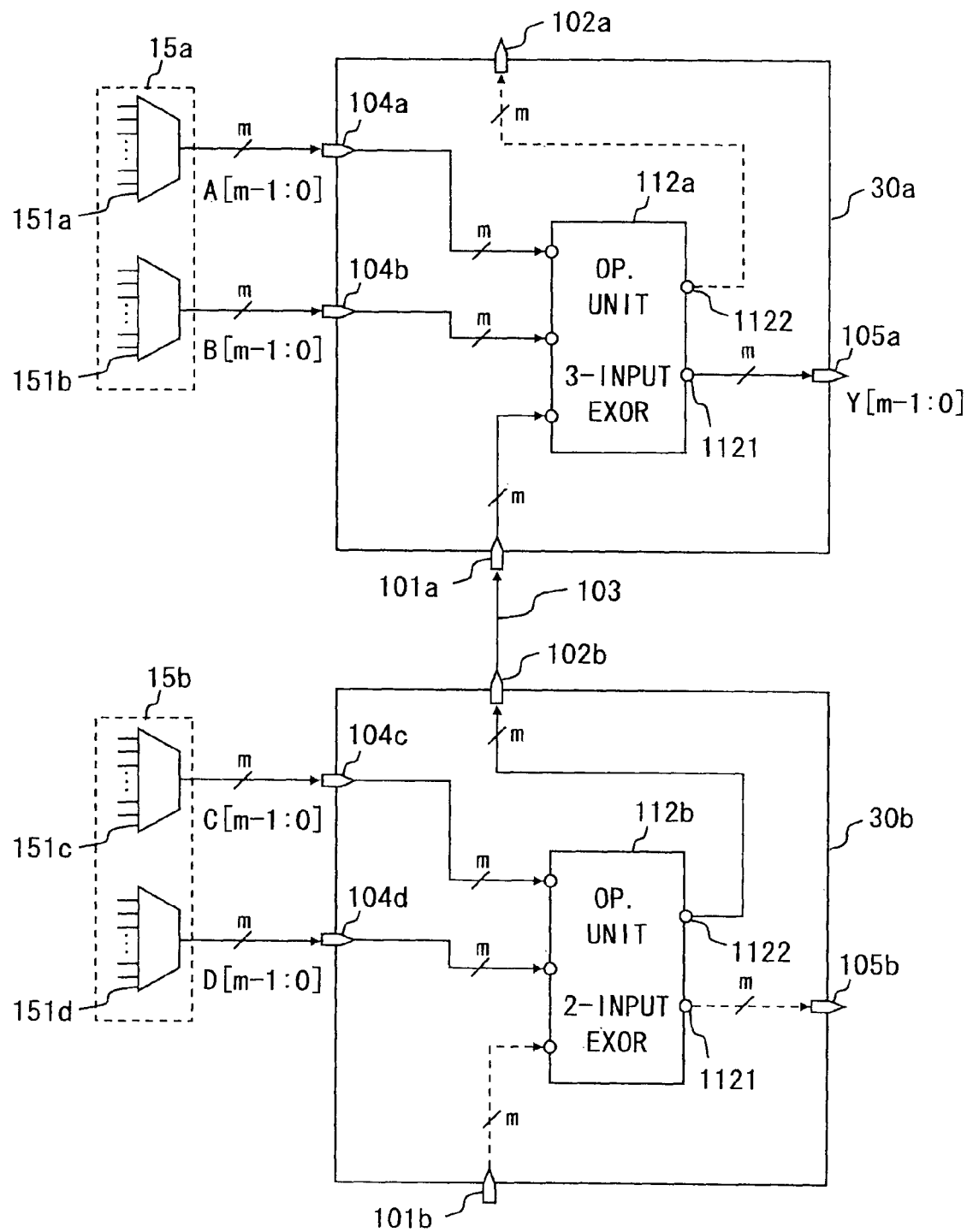
FIG. 16 is a block diagram for achieving a 4-input logic operation in the reconfigurable device according to an embodiment of the present invention.

FIG. 16 shows the configuration example for achieving a 4-input operation by the reconfigurable device 3 of this embodiment. By the configuration of FIG. 16, an operation result from an exclusive OR operation for m bit data A to D that is input to the input ports 104a and 104b of the function block 30a and the input ports 104c and 104d of the function block 30b can be output to the output port 105a of the function block 30a. This will be described in detail hereinafter.

Firstly in the 3-input operation unit 112b of the function block 30b, an exclusive OR for m bit data C and D (C^D) is processed, where the m bit data C and D being input to the input ports 104c and 104d. The 3-input operation unit 112b is formed to achieve an operation of a 2-input exclusive OR. The operation result is output to the direct output port 102b.

In the function block 30a, m bit data A and B that is input from the input ports 104a and 104b is input to the 3-input operation unit 112a. Further, an exclusive OR result for the data C and D (C^D) that is input from the direct input port 101a is input to the 3-input operation unit 112a. The 3-input operation unit 112a processes an exclusive OR for the three values being input and outputs the operation result to the output port 105a. By this, the operation results of the exclusive OR for the four data A to D that are input to the two function blocks 30a and 30b are output to the output port 105a.

As described above, the reconfigurable device 3 of this embodiment is also able to achieve a 4-input operation using two function blocks as with the reconfigurable device 1 and 2. Note that in FIG. 16, an input source for four data A to D can be freely selected by the input selection units 151a to 151d included in the programmable switches 15a and 15b. Thus even if the input ports to the function block 30 is made to be 3 inputs, the size of the programmable switch 15 and configuration memory 16 need not to be increased as compared to the configuration for 2-input.

Further, to perform a 4-input operation in the reconfigurable devices 1 and 2, the operation units in the function block is made to have 4 inputs. However the operation unit 122 of the function block 30 in the reconfigurable device 3 according to this embodiment only needs to have 3 inputs. Thus as compared to the reconfigurable devices 1 and 2, the reconfigurable device 3 is able to further reduce the circuit size or circuit area as compared to the reconfigurable devices 1 and 2.

Furthermore, in the reconfigurable device 3, the number of direct lines 103 between the function blocks is less than the reconfigurable devices 1 and 2. The larger the data bit wide, the more the wiring resource increases. Further, if the distance between the function blocks increases, buffer required for data relay cannot be ignored. Thus the reconfigurable device 3 having small number of direct lines 103 is advantageous.

Figure 17:
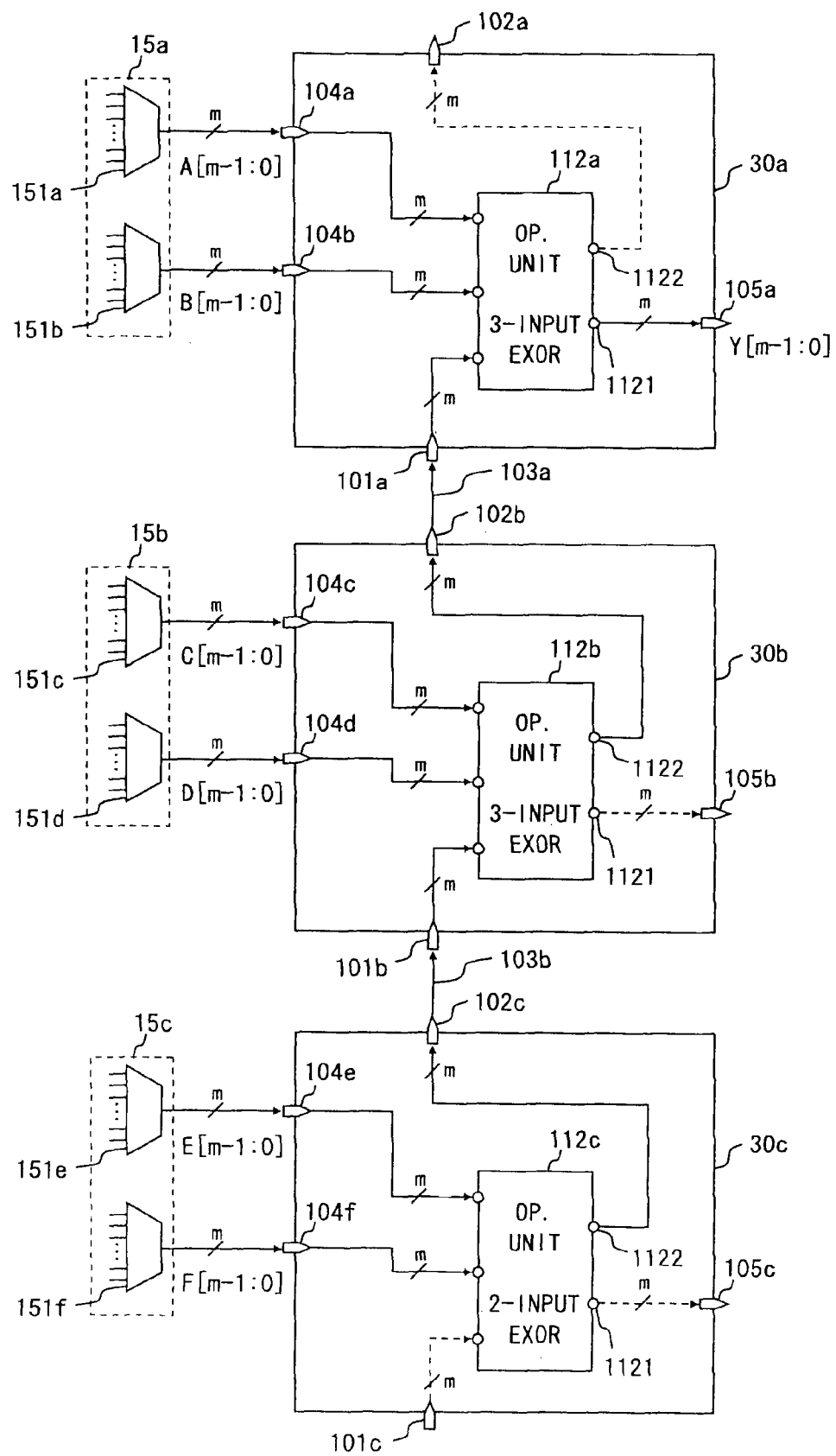
FIG. 17 is a block diagram for achieving a 6 input logic operation in the reconfigurable device according to an embodiment of the present invention.

FIG. 17 shows the configuration for achieving a 6 input operation, specifically an operation of an exclusive OR for 6 input data A to F in the reconfigurable device 3. Firstly among the 6 input data A to F, E and F is input to a function block 30c and a result of an operation of an exclusive OR by a 3-input operation unit 112c is output from a direct output port 102c.

The function block 30b processes an exclusive OR for three values of the data C and D that is input to the input ports 104c and 104d and the operation result data of an exclusive OR for the data E and F that is input to the direct input port 101*b*. The operation result of the function block 30*b* is output to the direct output port 102*b*.

Furthermore, the function block 30*a* processes an exclusive OR for three values of the data A and B that is input to the input ports 104*a* and 104*b* and the operation result data of an exclusive OR for the data C to F that is input to the direct input port 101*a*. The operation result of the function block 30*a* is output to the output port 105*a*. By this, an operation result of an exclusive OR for six data A to F that are input to the three function blocks 30*a* to 30*c* is output to the output port 105*a*. Note that an input source for the six data A to F can freely be selected by the input selection units 151*a* to 151*f* of the programmable switch 15*a* to 15*c*.

As described above, the reconfigurable device 3 of this embodiment can be extended to perform multi-input exceeding 4-input by connecting between the function blocks 30 by the direct line 103.

Figure 15:
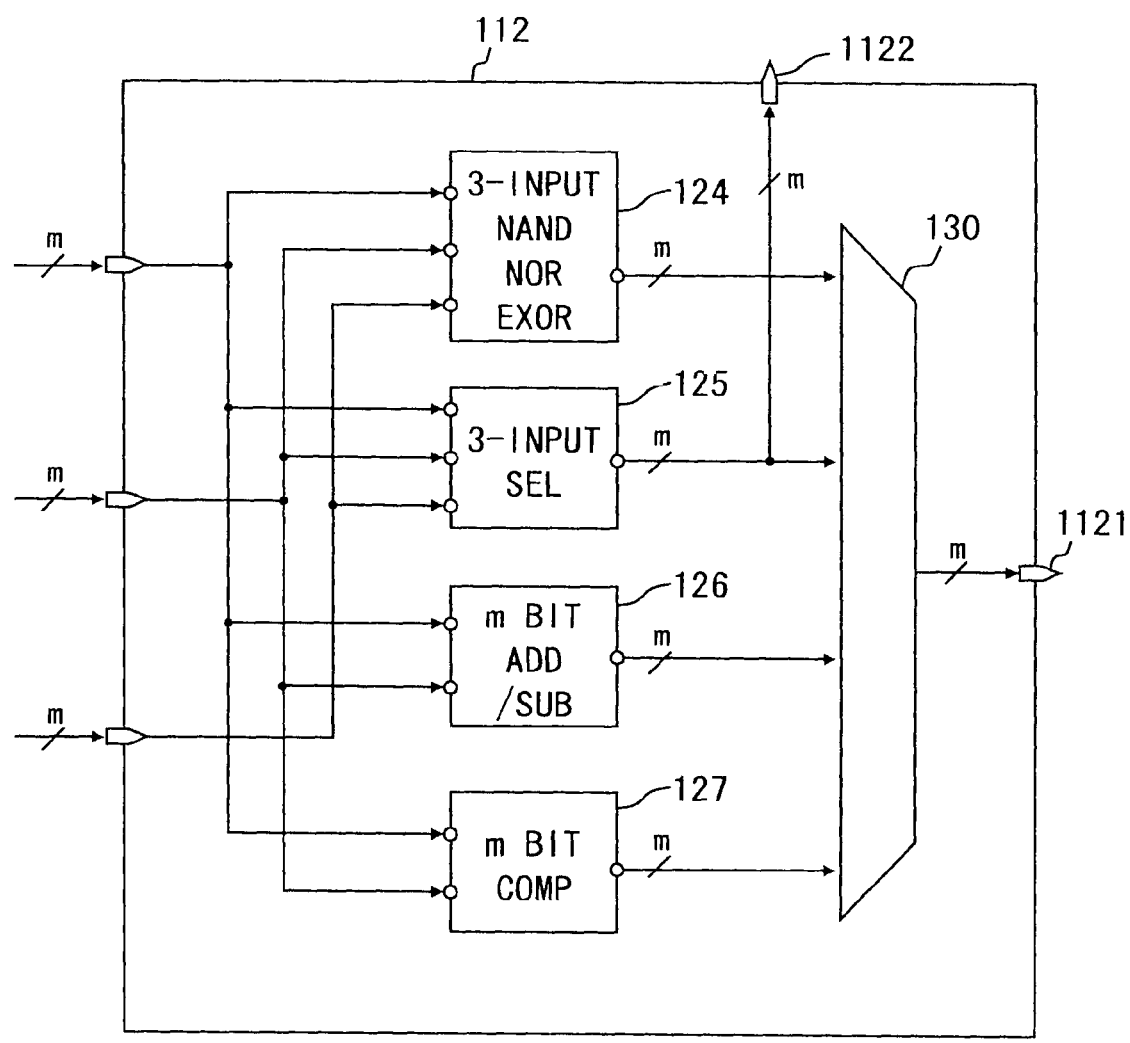
FIG. 15 shows a configuration example of a 3-input operation unit.

Note that the function block 30 shown in FIG. 13 is illustrative only. For example as shown in FIG. 15, instead of the output from the multiplexer 130, one of the outputs from the operation units 124 to 127 (in FIG. 15, output from 3-input selector 125) can be connected to the output port 1122 that is connected to the output port 102 of the function block 30. With such configuration, only an operation result of a particular operation unit connected to the output port 1122 can be output to the direct output port 102 of the function block 30. However, as the multiplexer 130 is not intervened, signal delay by lines can be reduced. Thus the configuration as in FIG. 15 is advantageous especially to perform an operation at high speed for a particular multi-input operation.

Fourth Embodiment

Figure 18:
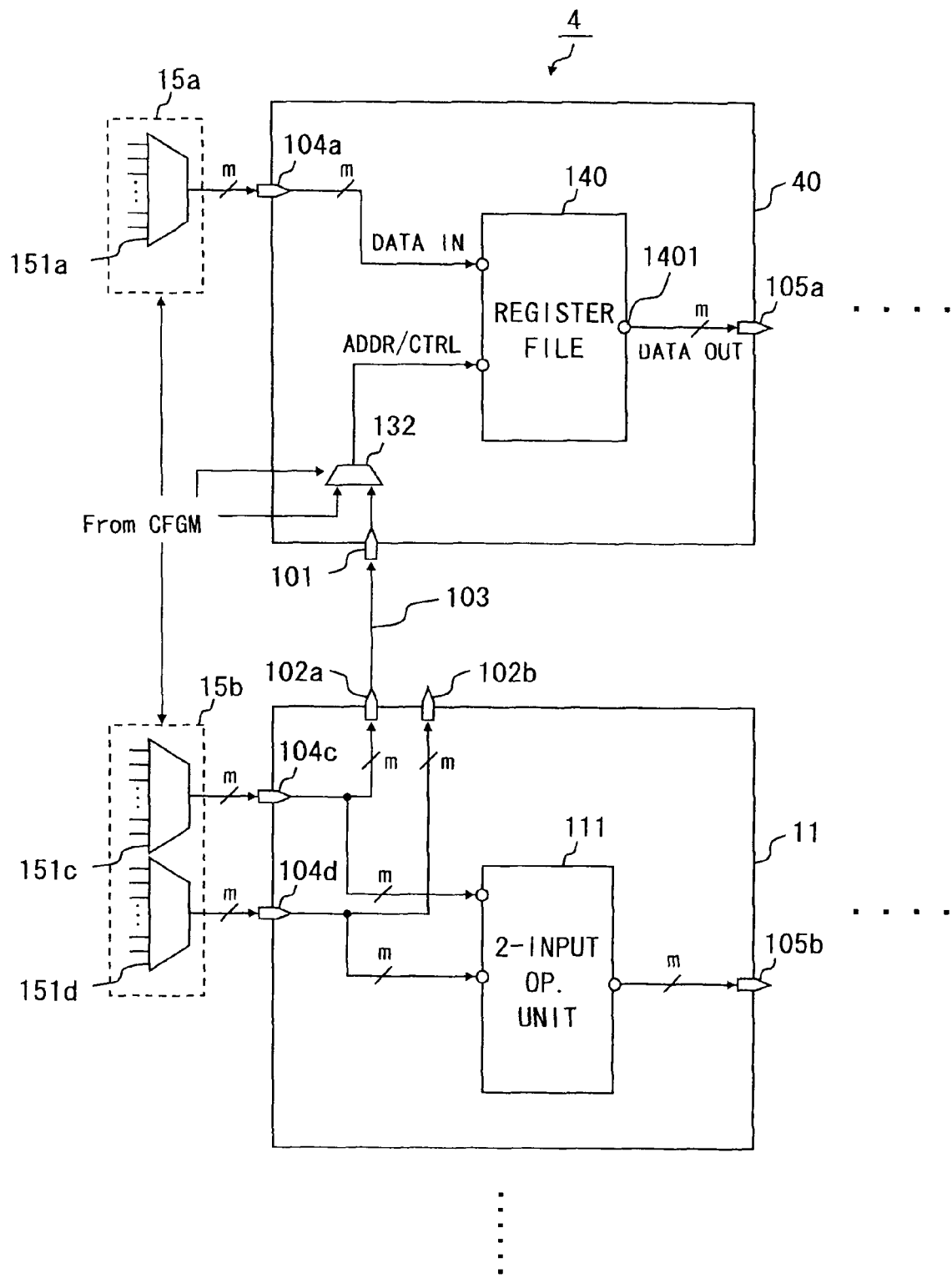
FIG. 18 shows a connection of function blocks of a reconfigurable device according to an embodiment of the present invention.

FIG. 18 shows the configuration of a function block 40 included in a reconfigurable device 4 according to this embodiment. The function block 40 includes a register file 140, which is a memory unit for retaining input data. Components identical to the components included in the reconfigurable device 1 are denoted by reference numerals identical to those therein with detailed description omitted.

Write data to the register file 140 included in the function block 40 is usually input from the input port 104*a*. Further, inputting a read/write address to the register file 140 and performing an enable control is usually performed by the configuration memory 16. However by switching the multiplexer 132, it is possible to input a read/write address or perform an enable control by a signal input from the direct input port 101.

Figure 19:
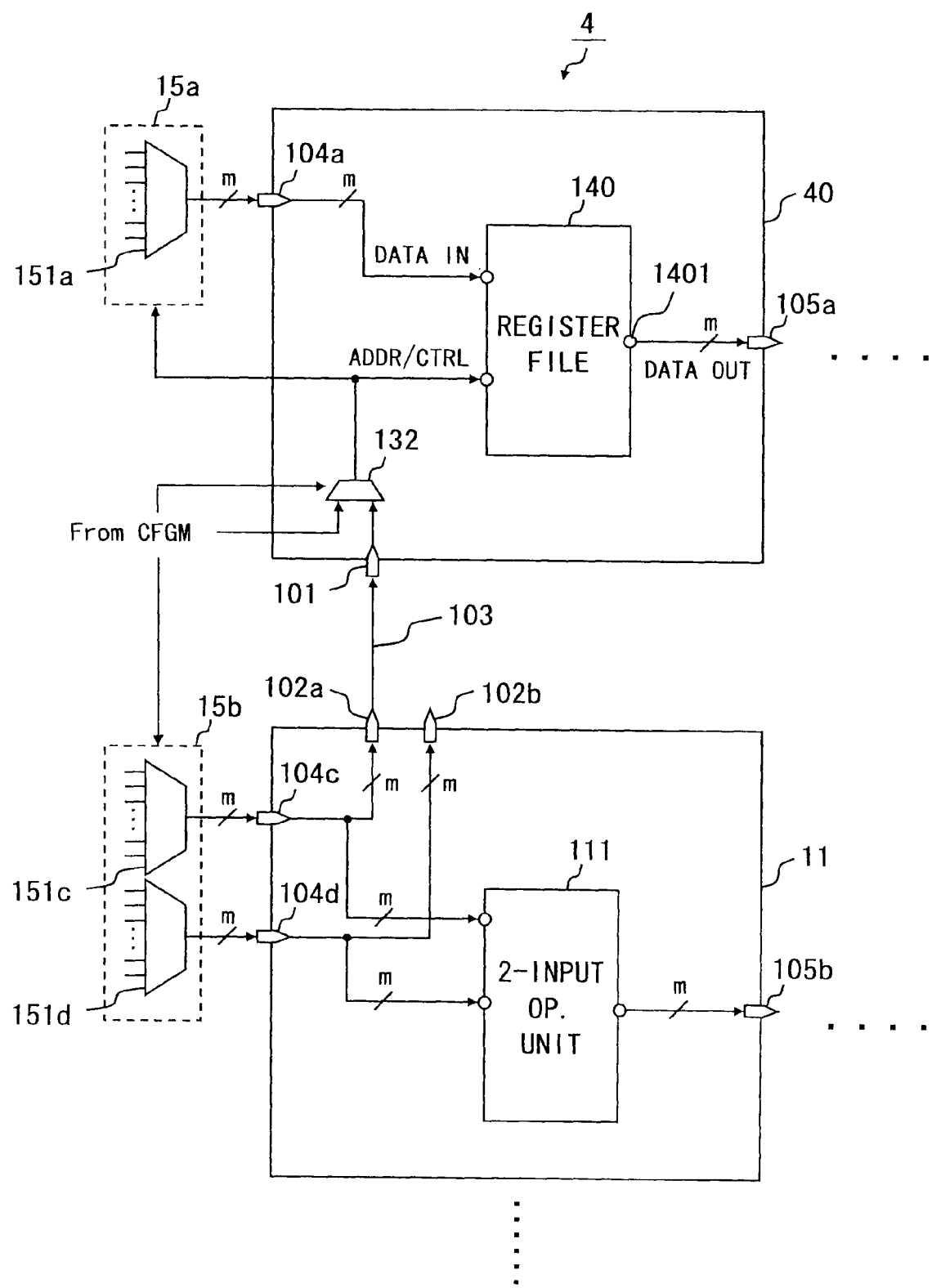
FIG. 19 shows a connection of function blocks of the reconfigurable device according to an embodiment of the present invention.

Further, as shown in FIG. 19, a signal input from the direct input port 101 may be supplied to a control line for the input selection unit 151*a* of the programmable switch 15*a* that is connected to the input port of the register file 140. In such case, for example if an output value of the input selection unit 151*a* is reset to 0 by supplying the value "0" to the control line for the input selection unit 151*a*, by inputting the value "0" to the control line for the input selection unit 151*a* from the direct input port 101, the output value of the input selection unit 151*a* can forcibly reset.

Figure 20:
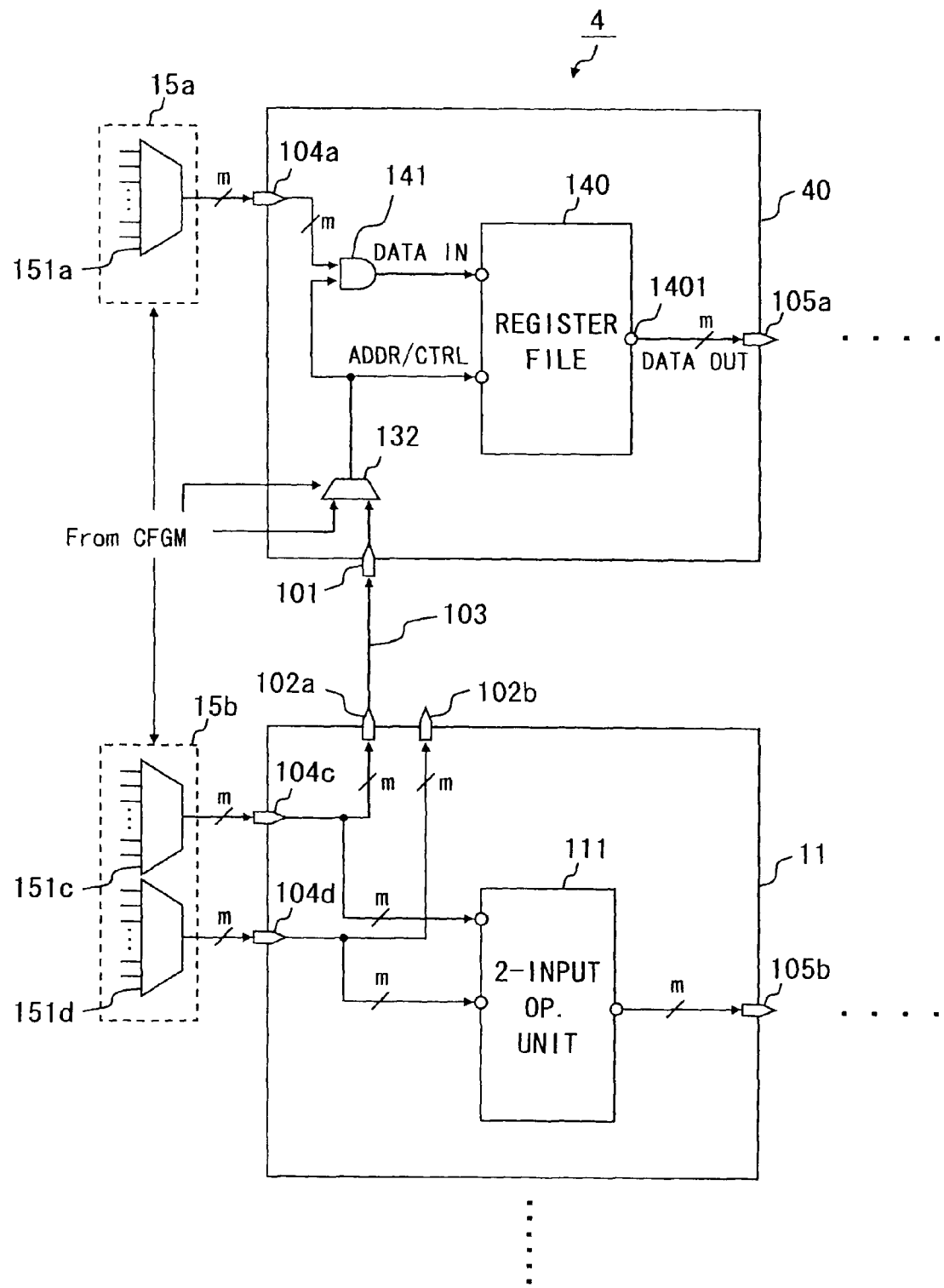
FIG. 20 shows a connection of function blocks of the reconfigurable device according to an embodiment of the present invention.

Note that with the configuration of FIG. 20, a reset process can be executed to reset a data input value of the register file 140 to 0 by using an input signal from the direct input port 101. Specifically, an AND gate 141 is provided to the data input side of the register file, input data from the direct input port 101 is input to the AND gate 141 and an output value is input to the register file 140. However with the configuration of FIG. 20, as compared to the configuration shown in FIG. 19, setup delay until inputting a value to the register file 140 increases for the AND gate 141.

With this configuration, in a reconfigurable device having a register file as a kind of a function block, an input signal from the direct input port 101 can be used for address specification of a register file, enable control and reset control.

Figure 21:
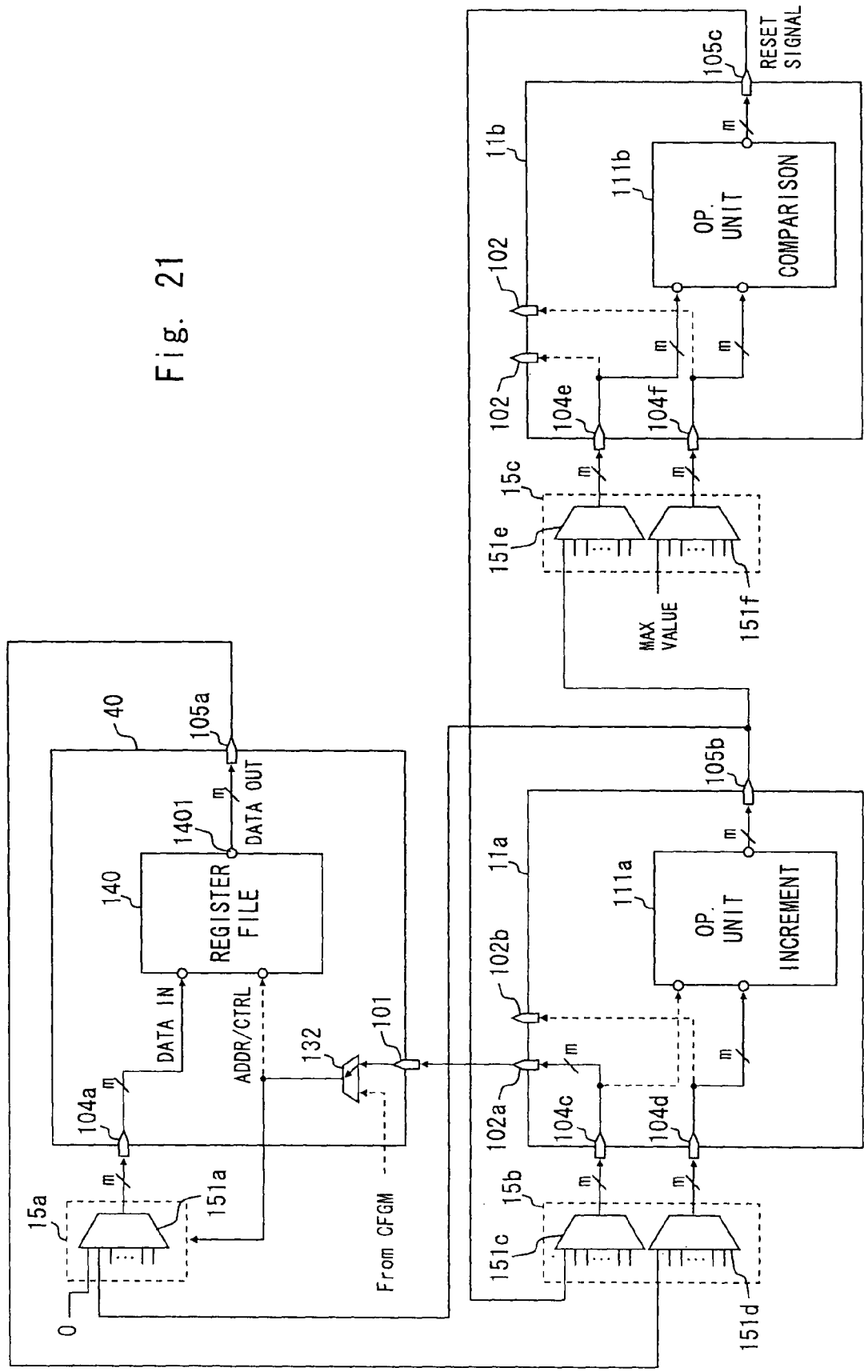
FIG. 21 is a block diagram for achieving a counter circuit by the reconfigurable device according to an embodiment of the present invention.
Figure 22:
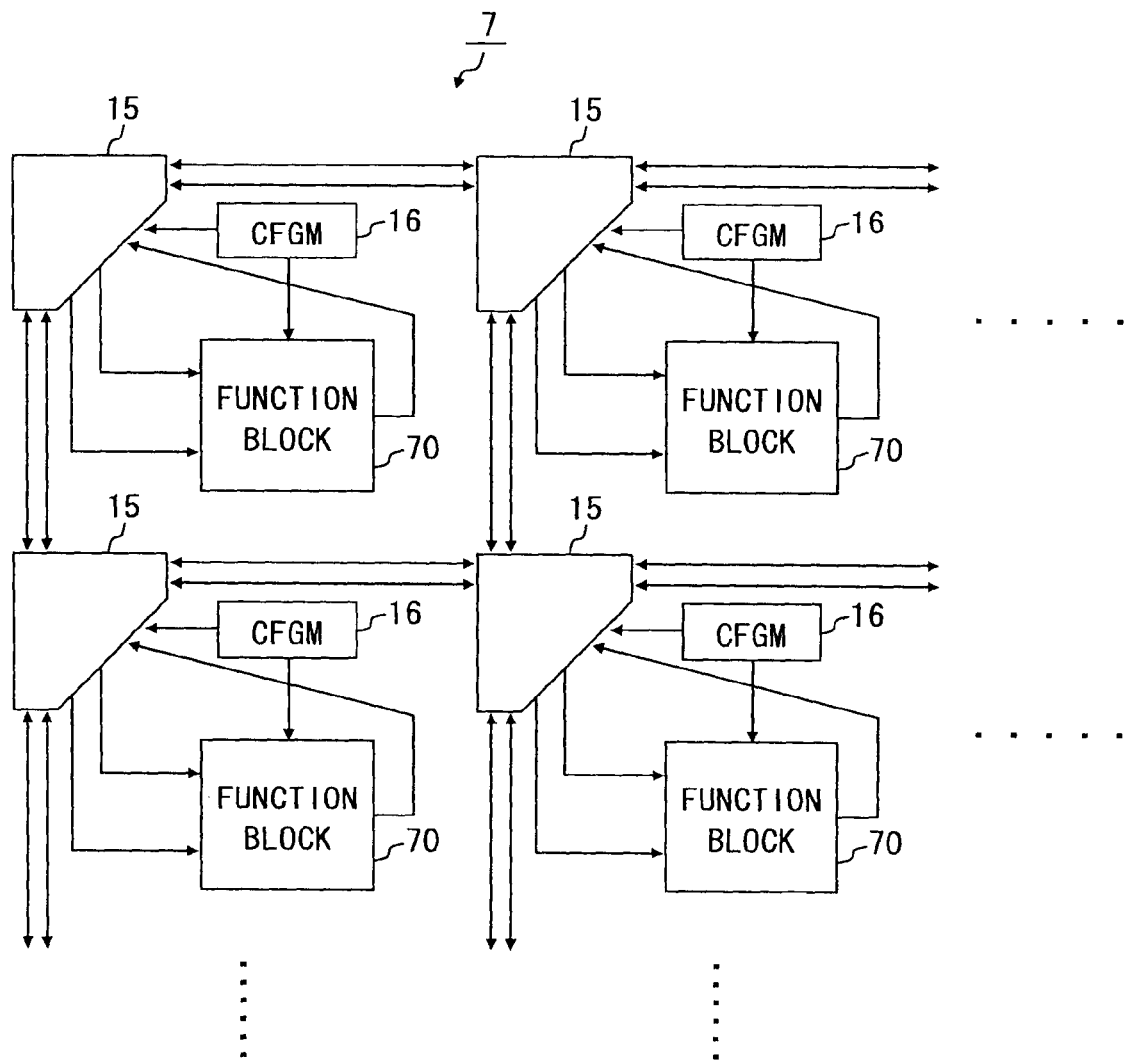
FIG. 22 is a block diagram of a reconfigurable device according to the related art.
Figure 23:
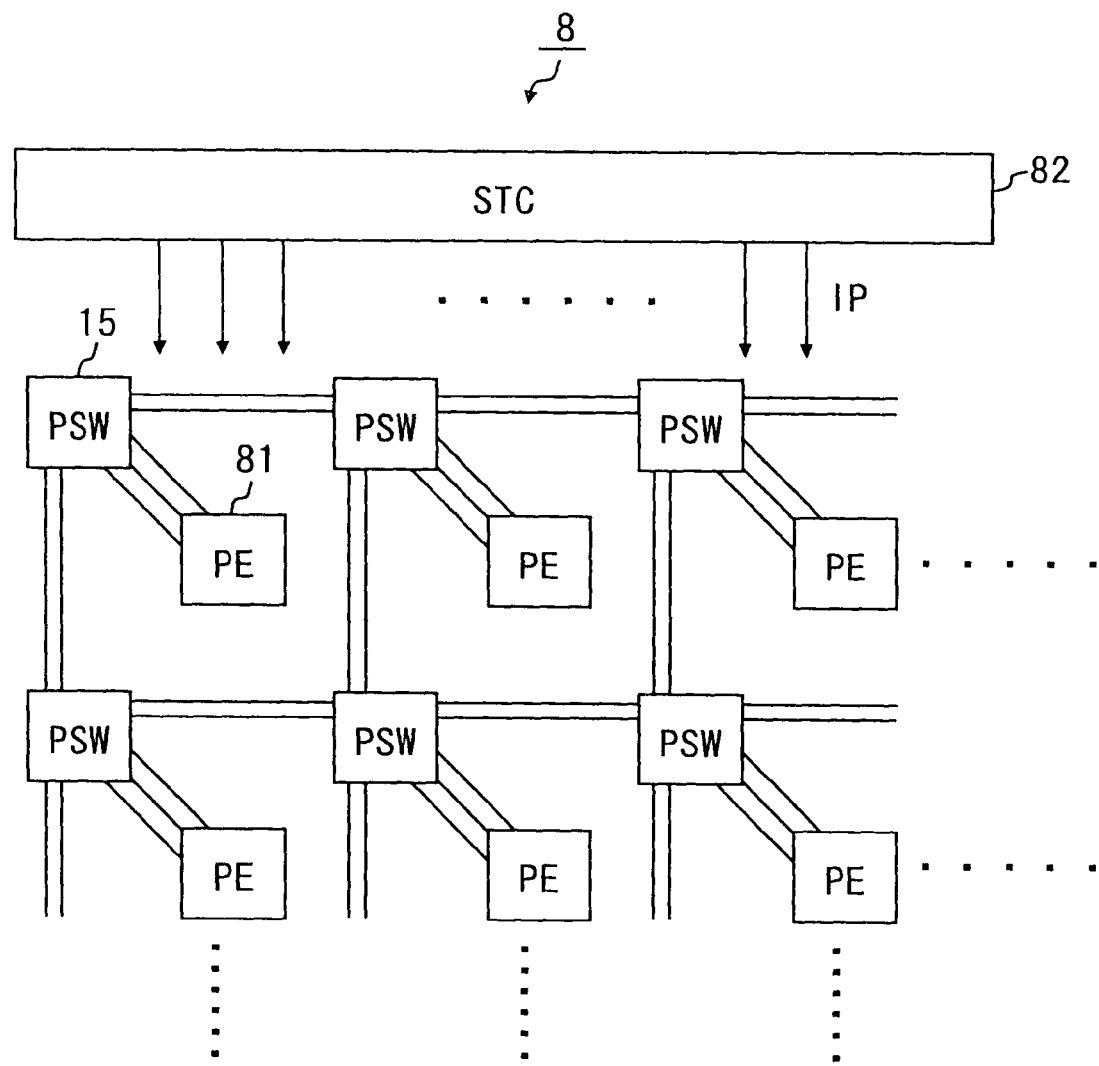
FIG. 23 is a block diagram showing an array processor according to the related art.
Figure 24:
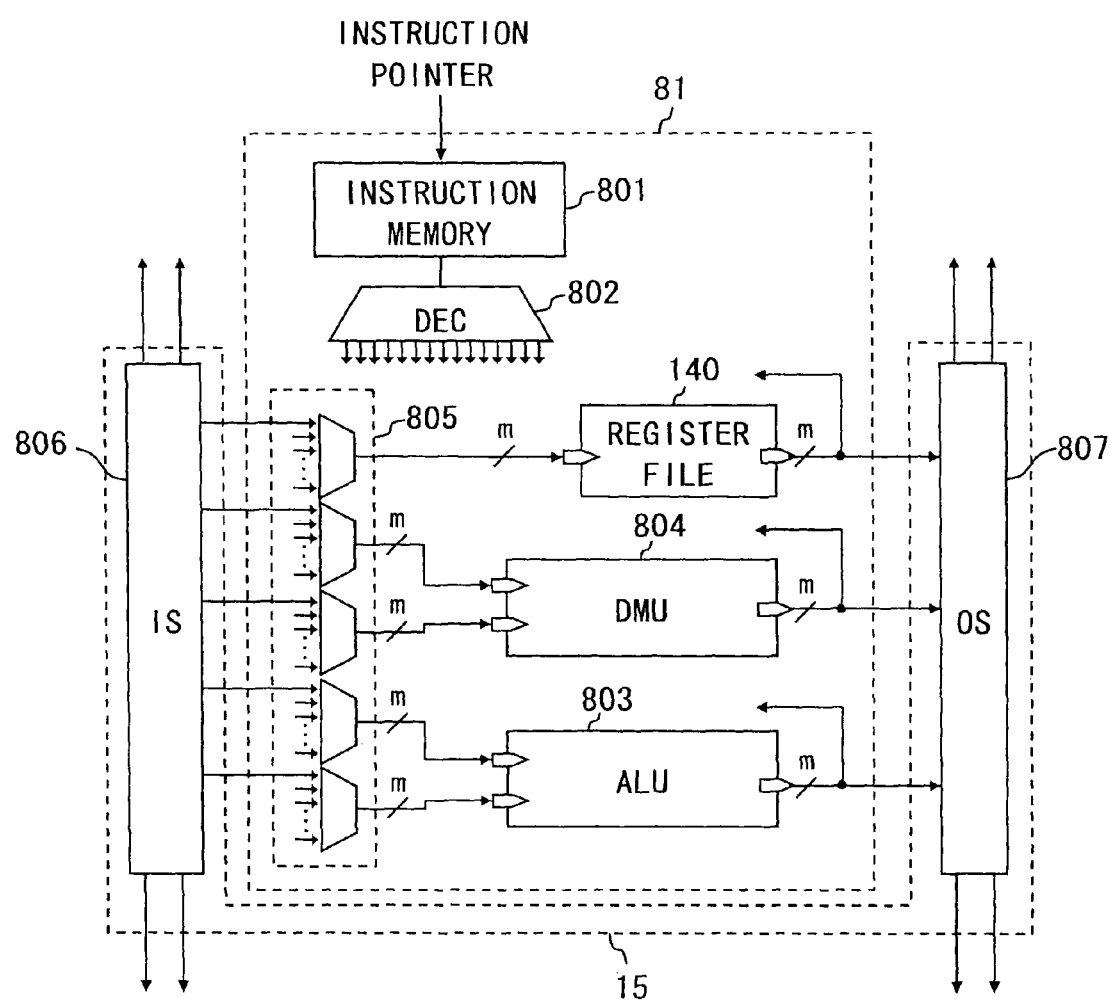
FIG. 24 is a block diagram of a processor element according to the related art.
Figure 25:
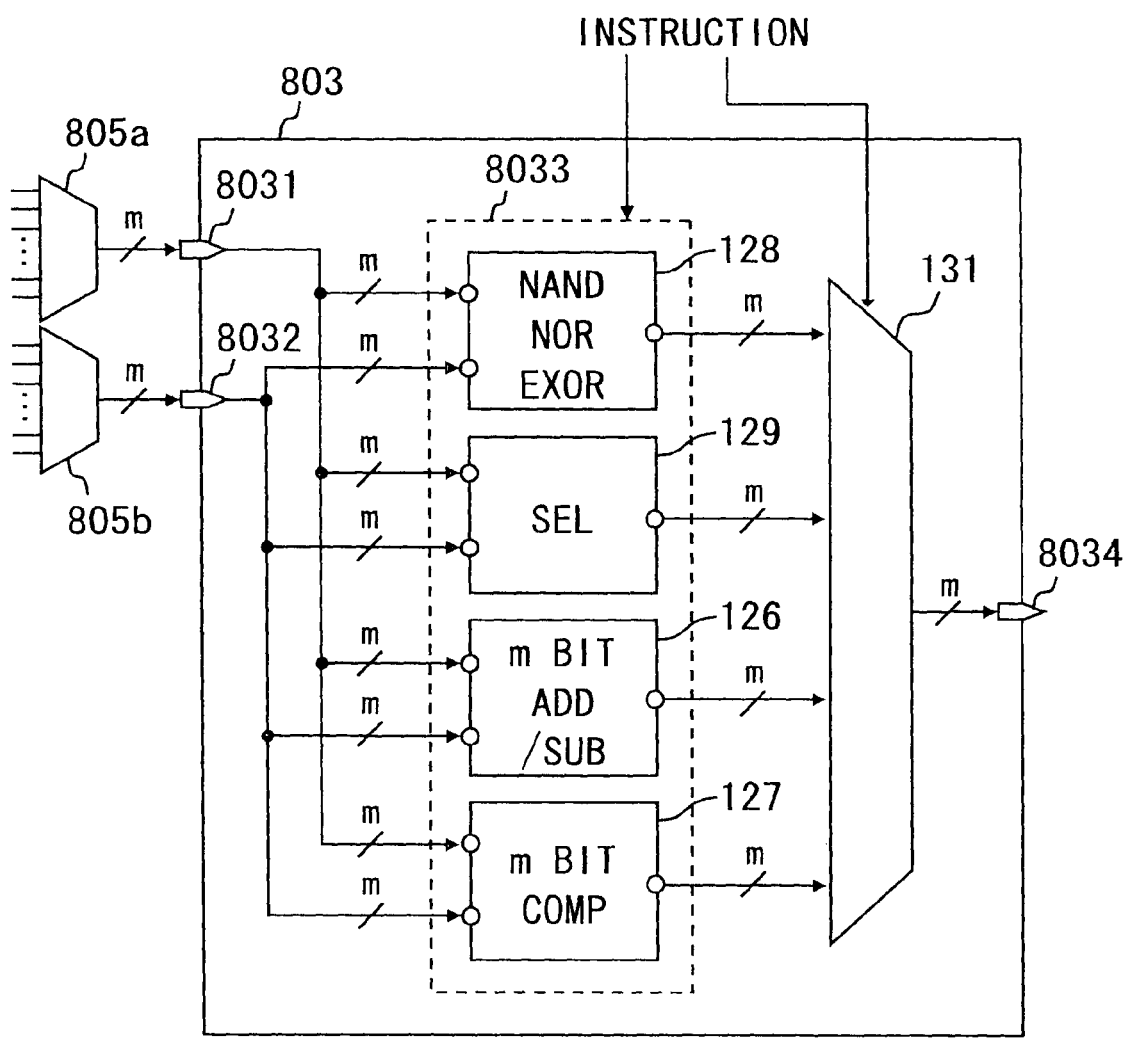
FIG. 25 is a block diagram of an ALU according to the related art.
Figure 26A:
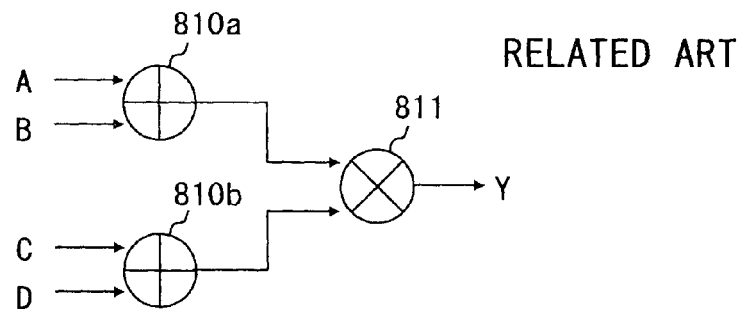
FIGS. 26A and 26B show a comparison between a circuit size of a dedicated circuit and that of the reconfigurable device.
Figure 26B:
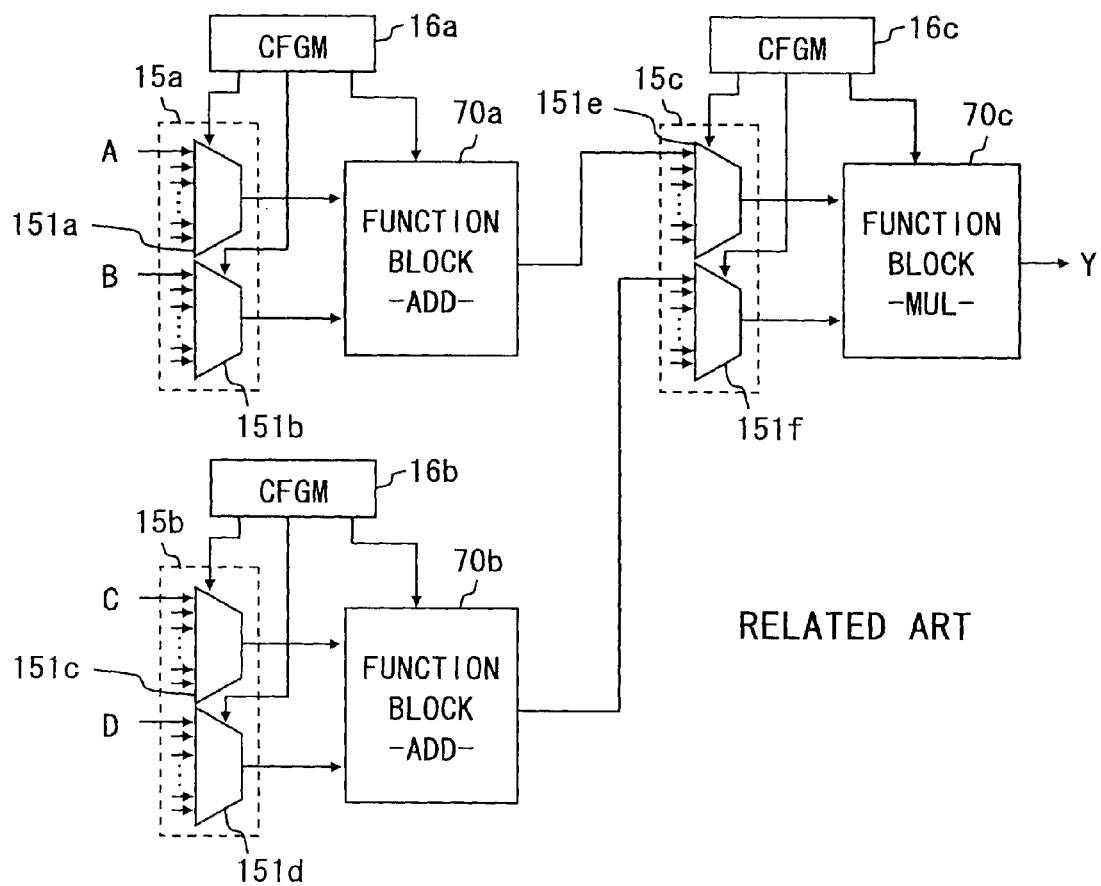

An example is shown in FIG. 21 in which a counter circuit is formed in the reconfigurable device 4 of this embodiment. This counter circuit increments by every clock cycle and returns to 0 when reaching a predetermined value.

For two input data to a function block 11*a*, the input data to the input port 104*c* is output to the direct output port 102*a* and input data to another input port 104*d* is input to the 2-input operation unit 110*a*. As the function block 11*a* executes an increment process, an input to the operation unit 110*a* is only one. Therefore, there is no problem to use one of the two input ports (input port 104*c*) for supplying data to other function block 40.

A function block 11*b* inputs an increment value by the function block 11*a* and a predetermined maximum value. The two input values are compared in the operation unit 110*b* and if they match, the operation unit 110*b* output a reset signal. The reset signal output from an output port 105*c* of the function block 11*b* is supplied to an input selection unit 151*c* that is connected to the input port 104*c* of the function block 11*a*. Then the reset signal reaches a function block 40 via the direct output port 102*a* and direct input port 101. As described referring to FIG. 19, the reset signal that has reached a function block 40 is supplied to a control line for the input selection unit 151*a*, an output value of the input selection unit 151*a* is forcibly reset and a value of the register file 140 connected to the input selection unit 151*a* is reset to 0.

In order to form a same counter circuit as FIG. 21 without resetting the register file 140 using the input signal from the direct input port 101 and adding an input port to the function block, an additional function block is required between the function block 11*b* and function block 40. Specifically, it is a function block that operates as a selector to select "0" in response to the reset signal output from the function block 11*b*. In this embodiment, an operation speed of the counter circuit mapped to the reconfigurable device 4 can be improved because this additional block is unnecessary and the number of stages for the function blocks between the register file can be reduced.

Depending on an application program, there are times when enabling register file, controlling reset or address should be performed. In a reconfigurable device of the related art, increasing the input ports to the register file leads to increase the input ports to the function block. This consequently increases the input selection units 151 of the programmable switch 15 and configuration information to be stored in the configuration memory 16. On the other hand, in the reconfigurable device 4 of this embodiment, the size of the programmable switch 15 and configuration memory 16 needs not to be increased even with increased number of the input ports to the function block, because the direct lines for connecting between the function blocks can be used to control enabling or resetting the register file and control address or the like.

In the first to fourth embodiments, a case to achieve a 4-input operation in the reconfiguration devices is mainly described. However the present invention is not limited to the above embodiment but can widely be incorporated to reconfigurable integrated circuits that determine a connection relationship between function blocks by a programmable switch.

It is apparent that the present invention is not limited to the above embodiments, but may be modified and changed without departing from the scope and spirit of the invention.

What is claimed is:

1. A reconfigurable integrated circuit, comprising:
a plurality of function blocks each comprising at least one operation unit or memory unit; and
a plurality of programmable switches being configured to switchably connect between function blocks included in the plurality of function blocks,
wherein the plurality of function blocks each includes at least one switchable data input port connected to at least an associated one of the plurality of programmable switches and at least one switchable data output port connected to the associated one of the plurality of programmable switches, each of the at least one switchable data input port providing switchable input data into an operation unit or memory unit of the function block,
wherein at least two of the function blocks included in the plurality of function blocks are further directly connected to each other such that data output from a direct output port included in a one of the at least two function blocks can thereby be input with no switch intervening to a direct input port included in an other of the at least two function blocks, and
wherein the programmable switch connected to the one of the at least two function blocks can thereby be used for selectively switching input data to the one of the at least two function blocks to then be output, via the direct output port included in the one of the at least two function blocks, to the direct input port included in the other of the at least two function blocks.

2. The reconfigurable integrated circuit according to claim 1,
wherein the one of the at least two function blocks further inputs data, being supplied from the programmable switch to the data input port included therein, to an operation unit included therein, and
an obtained result from the operation unit is output to the direct output port.

3. The reconfigurable device according to claim 1, wherein at least one of the plurality of function blocks includes both of the direct input port and the direct output port.

4. The reconfigurable device according to claim 1,
wherein at least one of the plurality of function blocks includes a memory unit and the direct input port, the memory unit being able to input data with the programmable switch, and
operations of the memory unit are controlled according to data input to the direct input port.

5. The reconfigurable integrated circuit according to claim 1, wherein the operation unit comprises an adder/subtracter, a saturation calculation unit, a comparator, a multiplier, a divider, a logic operation unit, a selector, a barrel shifter, a bit mask unit and a Galois field multiplier, or an operation unit of a combination thereof.

6. The reconfigurable integrated circuit according to claim 1, wherein each of the plurality of function blocks includes a multi-input operation unit to perform an operation of at least two data inputs and an operation unit having a data bit width at least twice as wide as a data bit width of an input port of the function blocks.

7. The reconfigurable integrated circuit according to claim 1, further comprising:
a configuration memory to store configuration information of the plurality of programmable switches,
wherein a connection relationship between the function blocks is changed by controlling the plurality of programmable switches according to the configuration information stored in the configuration memory.

8. The reconfigurable integrated circuit according to claim 1, further comprising:
a plurality of processor elements arranged in a matrix; and
an instruction memory, an instruction decoder, the function blocks, and a programmable switch formed to each of the processor elements,
wherein processing of the function blocks and switching of connections between the processor elements by the programmable switch are controlled by the instruction decoder decoding an instruction code stored in the instruction memory and supplied to the function block and the programmable switch.

* * * * *

UNITED STATES PATENT AND TRADEMARK OFFICE
CERTIFICATE OF CORRECTION

| | |
|---|---|
| PATENT NO. | : 8,041,925 B2 |
| APPLICATION NO. | : 11/819976 |
| DATED | : October 18, 2011 |
| INVENTOR(S) | : Toshirou Kitaoka |

It is certified that error appears in the above-identified patent and that said Letters Patent is hereby corrected as shown below:

Title page, Item (73) Assignee, add additional Assignee:

--NEC CORPORATION
Tokyo, Japan--

Signed and Sealed this
Third Day of July, 2012

David J. Kappos
*Director of the United States Patent and Trademark Office*